(12) United States Patent
LaDuke et al.

(10) Patent No.: US 8,845,108 B2
(45) Date of Patent: Sep. 30, 2014

(54) HIGH DYNAMIC RANGE SCENOGRAPHIC IMAGE PROJECTION

(75) Inventors: Thomas F. LaDuke, Orange, CA (US); Richard Bradley Turner, Valencia, CA (US); Steven T. Kosakura, Tustin, CA (US); Bryan Lee Jolley, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 13/385,551

(22) Filed: Feb. 24, 2012

(65) Prior Publication Data

US 2012/0154695 A1    Jun. 21, 2012

Related U.S. Application Data

(62) Division of application No. 12/316,776, filed on Dec. 16, 2008, now Pat. No. 8,231,225.

(60) Provisional application No. 61/188,400, filed on Aug. 8, 2008.

(51) Int. Cl.
    *G03B 21/14*    (2006.01)

(52) U.S. Cl.
    CPC ..................................... *G03B 21/14* (2013.01)
    USPC ........................................... 353/28; 353/121

(58) Field of Classification Search
    USPC .............. 353/28, 30, 121, 122; 348/136, 137, 348/370; 382/254, 274; 345/629, 630, 7, 9
    See application file for complete search history.

(56) References Cited

U.S. PATENT DOCUMENTS

| 4,591,918 | A |   | 5/1986  | Hisano             |
|-----------|---|---|---------|--------------------|
| 4,887,898 | A |   | 12/1989 | Halliburton et al. |
| 4,908,876 | A |   | 3/1990  | DeForest et al.    |
| 5,220,624 | A |   | 6/1993  | Sakamoto et al.    |
| 5,325,473 | A |   | 6/1994  | Monroe et al.      |
| 5,331,359 | A | * | 7/1994  | Leclercq .......................... 353/28 |
| 5,560,696 | A | * | 10/1996 | Orlich ............................ 353/28 |
| 5,969,754 | A | * | 10/1999 | Zeman .......................... 348/136 |

(Continued)

FOREIGN PATENT DOCUMENTS

| EP | 1107052 A1    | 6/2001 |
| FR | 2755211 A1    | 4/1998 |
| JP | 2003-131319 A | 5/2003 |

OTHER PUBLICATIONS

Author Unknown, "Color Theory", Wikipedia.com, at least as early as Sep. 9, 2008, http://en.wikipedia.org/wiki/color_theory, 5 pages.

(Continued)

*Primary Examiner* — William C Dowling
(74) *Attorney, Agent, or Firm* — Dorsey & Whitney LLP

(57) ABSTRACT

A high dynamic range scenographic image and video projection system and method involving the projection of an image of an object or collection of objects onto the object, 2D or 3D, in such a manner than projected image elements are positioned substantially on the actual image of the object. The projection enhances or otherwise alters the hue, contrast, brightness, saturation, luminance, and/or other visible features of the object. Visual and not-visual features may be projected onto the object or the area around the object to enhance or disguise the object as well as the surroundings of the object.

19 Claims, 26 Drawing Sheets

(56) References Cited

U.S. PATENT DOCUMENTS

| | | | |
|---|---|---|---|
| 6,301,044 B1 | | 10/2001 | Huber et al. |
| 6,379,009 B1 | * | 4/2002 | Fergason .................. 353/28 |
| 6,554,431 B1 | * | 4/2003 | Binsted et al. .................. 353/28 |
| 7,038,849 B1 | | 5/2006 | Samuels et al. |
| 7,248,406 B2 | | 7/2007 | May et al. |
| 7,579,592 B2 | * | 8/2009 | Kaushal .................. 250/330 |
| 8,031,933 B2 | | 10/2011 | Se |
| 8,064,684 B2 | * | 11/2011 | Ratti et al. .................. 382/154 |
| 8,256,900 B2 | * | 9/2012 | Bitetto .................. 353/28 |
| 2004/0111030 A1 | | 6/2004 | Zeman |
| 2006/0018535 A1 | * | 1/2006 | Oon et al. .................. 382/167 |
| 2007/0188719 A1 | | 8/2007 | Jaynes et al. |
| 2007/0195285 A1 | | 8/2007 | Jaynes et al. |
| 2007/0242240 A1 | | 10/2007 | Webb et al. |
| 2007/0268306 A1 | | 11/2007 | Webb et al. |
| 2007/0273795 A1 | | 11/2007 | Jaynes et al. |
| 2008/0151194 A1 | * | 6/2008 | Segev .................. 353/28 |
| 2008/0316432 A1 | * | 12/2008 | Tejada .................. 353/28 |
| 2010/0033682 A1 | | 2/2010 | LaDuke et al. |
| 2011/0019914 A1 | * | 1/2011 | Bimber et al. .................. 382/167 |

OTHER PUBLICATIONS

Author Unknown, "Colorfulness", Wikipedia.com, at least as early as Sep. 9, 2008, http://en.wikipedia. org/wiki/Saturation_(color theory), 3 pages.

Author Unknown, "Hue", Wikipedia.com, at least as early as Sep. 9, 2008, http://en.wikipedia. org/wiki/Hue, 3 pages.

Author Unknown, "Insolation", Wikipedia.com, at least as early as Sep. 9, 2008, http://en.wikipedia. org/wiki/Insolation, 2 pages.

Author Unknown, "Luminance", Wikipedia.com, at least as early as Sep. 9, 2008, http://en.wikipedia. org/wiki/Luminance, 2 pages.

Author Unknown, "Saturation", Pomona.edu, at least as early as Sep. 9, 2008, http://www.pomona.edu/academics/courserelated/classprojects/Visual-lit/saturation/saturation, 3 pages.

Author Unknown, "Scalable Display Technologies", scalabledisplay.com, at least as early as Feb. 3, 2010, http://www.scalabledisplay.com/files/SDT%20Description_0.pdf, 2 pages.

Author Unknown, "Spectrophotometry", Wikipedia.com, at least as early as Sep. 9, 2008, http://en.wikipedia. org/wiki/Spectrophotometry, 3 pages.

Damera-Venkata, "Realizing Super-Resolution with Superimposed Projection", IEEE International Workshop on Projector-Camera Systems (ProCams), Jun. 18, 2007, http://www.hpl.hp.com/research/pluribus/ pluribus_procams07.pdf, Jun. 18, 2007, 8 pages.

Lee, et al., "Automatic Projector Calibration with Embedded Light Sensors", Proceedings of the ACM Symposium on User Interface Software and Technology, Oct. 24-27, 2004, http://johnnylee.net/academic/proj4.pdf, 4 pages.

Prosecution Document, "PCT Invitation to Pay Additional Fees of Nov. 5, 2009", PCT Application No. PCT/US2009/051245, filed Jul. 21, 2009, Nov. 5, 2009, 5 pages.

Raskar, et al., "A Self Correcting Projector", Mitsubishi Electric Research Laboratories, 2001, http://www.merl.com, 8 pages.

* cited by examiner

HIGH DYNAMIC RANGE SCENOGRAPHIC IMAGE PROJECTION

CROSS-REFERENCE TO RELATED APPLICATIONS

This application is a divisional of co-pending U.S. application Ser. No. 12/316,776, filed Dec. 16, 2008, and entitled "HIGH DYNAMIC RANGE SCENOGRAPHIC IMAGE PROJECTION," which claims the benefit under 35 U.S.C. §119(e) to U.S. Provisional Patent Application No. 61/188,400, filed Aug. 8, 2008 and entitled "High Dynamic Range Scenographic Image Projection". The contents of each of these applications are hereby incorporated herein in their entireties.

FIELD OF THE INVENTION

Aspects of the present invention generally relate to image and video projection and more particularly relate to high dynamic range scenographic image projection.

BACKGROUND

Conventional and widely used scenographic projection techniques, whether used in amusement parks, theater productions, concert productions, and the like, use lighting techniques and technology dating back tens of years if not over 100 years ago. Essentially, the lighting techniques involve lights, whether colored or white, and whether stationary or movable, projected onto targeted portions of a set. Amusement parks and other settings may also integrate video or film projectors to provide a movie or other film on some particular surface, film screen or other surface, of the set. Such techniques, while providing vibrant settings are limited in many respects. For example, lighting is limited by the color of the bulb or bulbs in a given projector. The lights, while they may be moveable, wash the areas where the light is projected in only the color from the bulb. Various aspects of the present invention address these as well as many other drawbacks of current technology.

BRIEF DESCRIPTION OF THE DRAWINGS

The patent or application file contains at least one drawing executed in color. Copies of this patent or patent application publication with color drawing(s) will be provided by the Office upon request and payment of necessary fee.

SUMMARY

One aspect of the present disclosure involves a projection system comprising an object having a surface with an optical pattern. A projector is configured to emit patterned light towards the surface, wherein the pattern of the emitted light is aligned with the optical pattern of the surface so as to affect at least one attribute of light reflected from the surface.

Another aspect of the present disclosure involves a method for projecting comprising obtaining an image of an object having a surface with an optical pattern. The method further involves projecting patterned light towards the surface, wherein the patterned light is aligned with the surface's optical pattern so as to affect at least one attribute of the light reflected from the surface.

Another aspect of the present disclosure comprises a method for projecting comprising capturing an image of an object from a specific vantage point and obtaining a projectable image from the captured image. The method further involves, from a projector at the specific vantage point, projecting the projectable image onto the object and in alignment with the object.

Another aspect of the present disclosure involves a projection system comprising a combination rear projection and front projection screen defining a first projection surface and an opposing second projection surface. A first projector is positioned to project an image on the first projection surface. A second projector is positioned and configured to simultaneously with the projection of the first image, project a mirror image of the image on the second projection surface, such that the mirror image projection aligns with the image.

DETAILED DESCRIPTION

Aspects of the present disclosure involve a high dynamic range scenographic image and video projection system, method, and apparatus. One particular aspect of the present disclosure involves the projection of an image of an object onto the object in such a manner that projected image elements are positioned substantially on the actual object. The object may be two or three dimensional. The projection causes a high dynamic effect by enhancing or otherwise altering the hue, contrast, brightness, saturation, luminance, chroma, colorfulness and/or other visible features of the object. Hence, through deployment of the techniques set forth herein, visual as well as non-visible (e.g., infrared, etc.) features of an object may be altered. The projection may also include additional image projections other than an image of the object such that visual and non-visual features may be added to the object as well as a collection of objects.

Figure 1A:
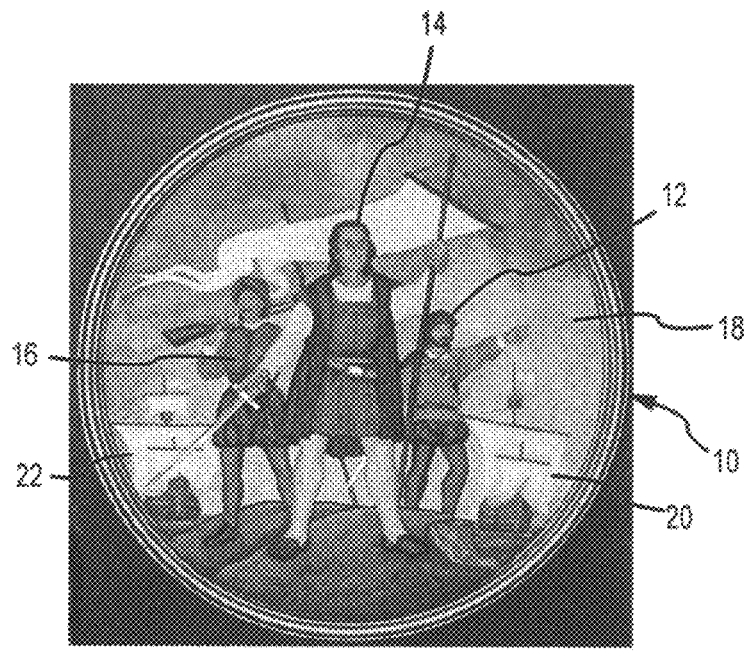
FIG. 1A illustrates a colored medallion.
Figure 1B:
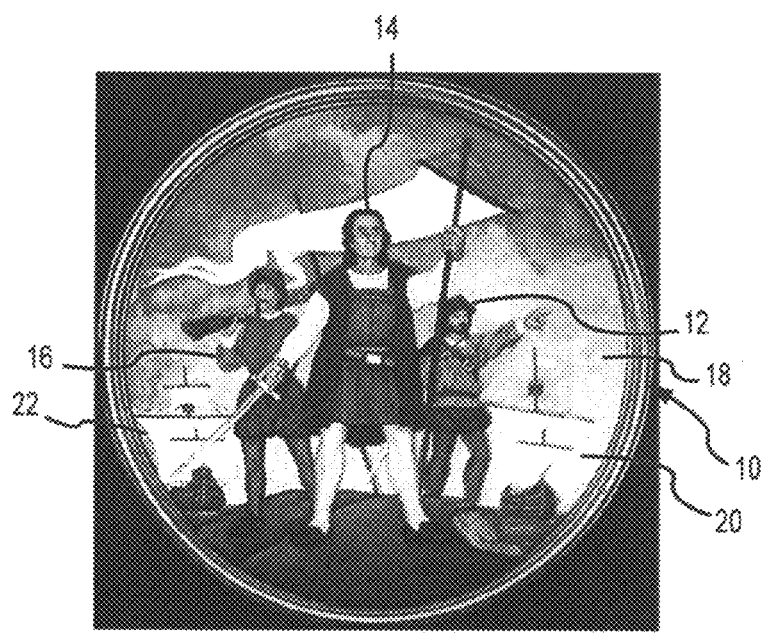
FIG. 1B illustrates the colored medallion of FIG. 1A with an image of the medallion projected on the medallion.

FIG. 1A illustrates a colored medallion 10 with three characters (12, 14, 16), a sky 18, two ships (20, 22) and some other features. FIG. 1B illustrates the colored medallion 10 of FIG. 1A with an image of the medallion projected on the medallion. As can be seen, at least contrast, saturation and hue are altered in FIG. 1B compared to FIG. 1A. Saturation is a term that refers to the amount of gray, white, black or the hue's complement in a color. The colors of the medallion of FIG. 1B appear to have less gray or other unsaturating colors and hence projecting the image of the medallion in alignment with the medallion increases saturation. Hue is a term with similar meaning to saturation, reflecting the purity of the color, where a hue refers to a pure color without tinting or shading. The colors of the medallion of FIG. 1B are more brilliant and hence appear as having less tint or shade that those of FIG. 1A. Moreover, the contrast of FIG. 1B is enhanced relative to FIG. 1A. As dynamic range is increased, the range of possible hue lightness saturation values for any pixel also increases. Therefore, the difference between any nearby colors can be greater. With techniques discussed herein, blacks in the media may become blacker when projected on darker objects. By the same token, whites may become whiter, reds may become redder, etc. Thus, by projecting a colored image of the object on the object so that object features align, saturation and hue are increased, and contrast is enhanced. In this case as well as in other implementations discussed herein, the reprojection of the image of the object on the object constructively interacts with the object such that the reflected light is altered in a way not possible from either the light reflected from the surface or the light projected on the surface alone (i.e., it imparts a quality to the look of the scene that is not possible with light reflected from the surface, or the light projected on the surface alone).

The medallion 10 is painted in opaque scenic paint style. However, any possible painting or coloring style, such as transparent water color, oil, pencil, etc., and different colors (including grey scale) may be used in various possible implementations. Certainly, it is also possible to use the systems and methods described herein on objects that are printed from digital images, objects that are fabricated with colored base materials, and objects presented on some form of display of a digital image of an object (e.g., liquid crystal display, plasma, etc.).

The medallion was then digitally photographed under outdoor daylight, although the image of the object or objects may be taken under different lighting conditions, whether artificial or natural, with attendant image impact due to the lighting. The image of the medallion was then projected on the actual medallion in such a way to minimize distortion of the image, and to align the image of the medallion with corresponding features of the medallion. Hence, for example, image features of the foreground character 14, such as the character's eyes, hands, shoes, etc., are aligned in FIG. 1B, with the actual eyes, hands, shoes, etc.

In any particular implementation, the object, whether two dimensional or three dimensional, will include a surface with some form of an optical pattern. The optical pattern may be from pigmentation of some form, such as paint, ink, and the like, may be integrated in the object, and/or projected from the object, as discussed above. A projector is arranged to project patterned light toward the surface of the object such that the projected patterned light is aligned with the optical pattern on the surface. The patterned light projection affects at least one attribute of light reflected from the surface. In one particular example, the alignment need not be precise to have the high dynamic effect. For example, with a 1024×768 projector resolution, a misalignment of 4-5 pixels or less is not easily perceivable, unless the viewer is very closer and the pixel size is relatively large, and is suitable to achieve the high dynamic effect. The visual perception of misalignment will vary depending on the distance of the viewer from the scene, pixel size and other factors, with misalignment in the range of 5-8 pixels generally being acceptable albeit slightly perceptible to some viewers.

There may be instances where misalignment varies across a projector field of view. For example, misalignment in a center region of the field of view may be small, in the range of 0-8 pixels, whereas misalignment in outer regions of the field of view may be larger, in the range of 8-15 pixels or greater. In such a case, misalignment in the center region will not be readily noticed by a viewer, whereas misalignments in the outer region may result in a blurred effect, reducing or eliminating the high dynamic effect. While such variations are not optimal, it may be the best achievable result given inherent limits in some projectors, imaging equipment, and other inaccuracies from any step discussed below. Hence, an image will be considered to be substantially aligned with the projector field of view when some portion of a projected image is aligned with the object in the range of 0-8 pixels. Projector focus may be counterbalanced with image quality to mitigate the visual effect of blurriness caused by having misalignments that are visible.

Figure 2:
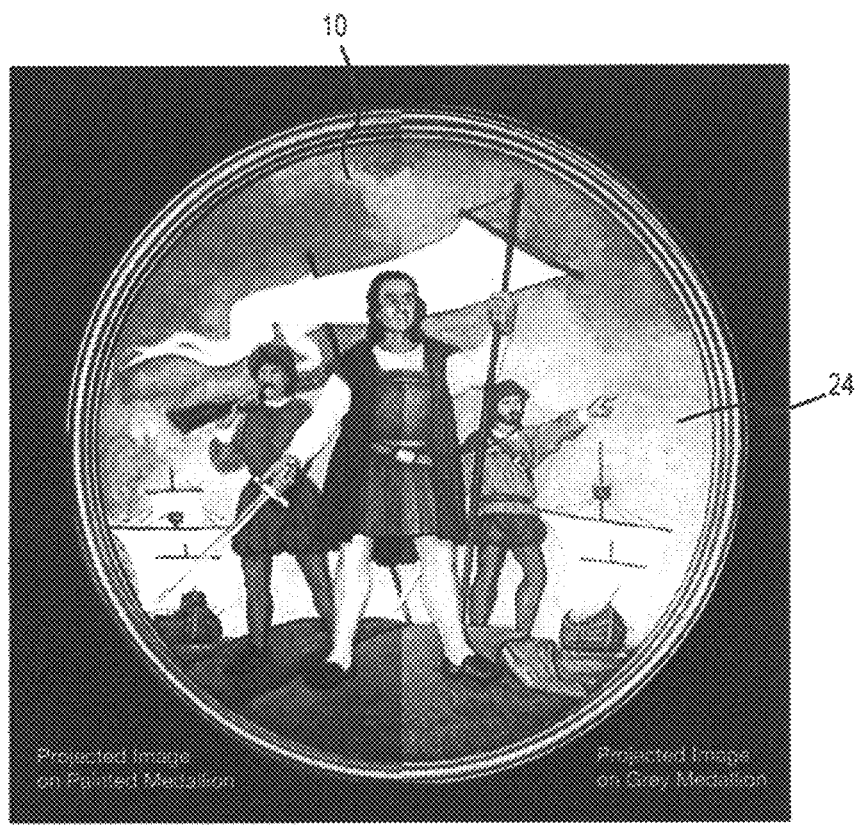
FIG. 2 illustrates a split image of the medallion of FIG. 1A, the left half of the image being a colored medallion as in FIG. 1A with the color image of the medallion projected on the colored medallion and showing enhanced color characteristics compared with FIG. 1A, the right half of the image being a grey scale medallion with the color image of the medallion projected on the grey scale image and showing enhanced color saturation and contrast as well as other color characteristics

It is also possible to project the image of a colored object or gray-scale, onto the same object, but with the object having different color features than the colored object. For example, FIG. 2 is a split image of the medallion 10, with a color image projected on a primer grey medallion 24 (right half), compared to the color image projected on the colored medallion 10 (left half). With such a relatively neutral color, such as grey compared to a range of color, various visual effects may be achieved. Moreover, it is also possible to digitally image a grey scale object, and color enhance the image of the object for projection of the color enhanced image onto the object. For example, the image may be colored with blue hues to provide an "icy" visual effect and the image may be colored with yellow hues to provide a warmer visual effect. When the respective images are projected on the colored object, grey scale or other object, the visual effect is achieved. Additionally, the image may be colored with other features to enhance or emphasize features, and with respect to video projection, the image may move to provide different effects. For example, the foreground characters eyes may be made to move by projecting an image of the eye and altering the video projection such that the eye moves, animating the medallion figure to some degree. Projecting a gray-scale image of an object on an object may have a different, perhaps opposite, image alteration effect as projecting a colored image of the object. For example, projection of a gray-scale image may reduce saturation and hue.

The coloring of the object, the pigments used to create the coloring and other features of the object, will reflect image projections differently, attenuating different portions of the visual spectrum, etc. Hence, any implementation will be affected depending on the coloring of the object, the lighting conditions under which the image of the object is taken, as well as ambient lighting conditions when the image is projected on the object. Additionally, the light source for the images will alter the appearance of the object when the image is projected on it. For example, digitally photographing the medallion 10 under different light sources affects the reprojected image by shifting the color to favor the spectral content of the projector light source and the spectral content of the photography light source.

Figure 3:
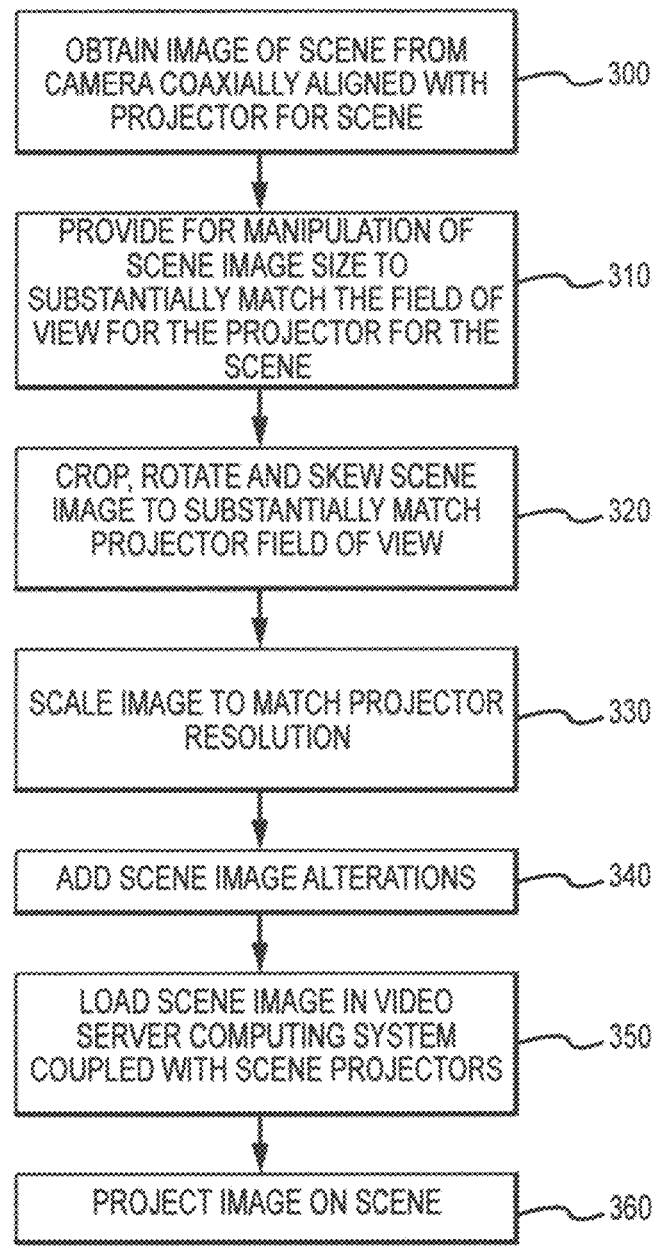
FIG. 3 is a flowchart illustrating one possible method of high dynamic range scenographic projection.

FIG. 3 is a flowchart illustrating one possible method of high dynamic range scenographic projection. The method of FIG. 3 may be practiced by various possible system implementations, including a high dynamic range scenographic projection system illustrated in FIG. 4. Depending on the system employed, various operations of FIG. 3 may or may not be employed to achieve the high dynamic range effect.

Figure 4:
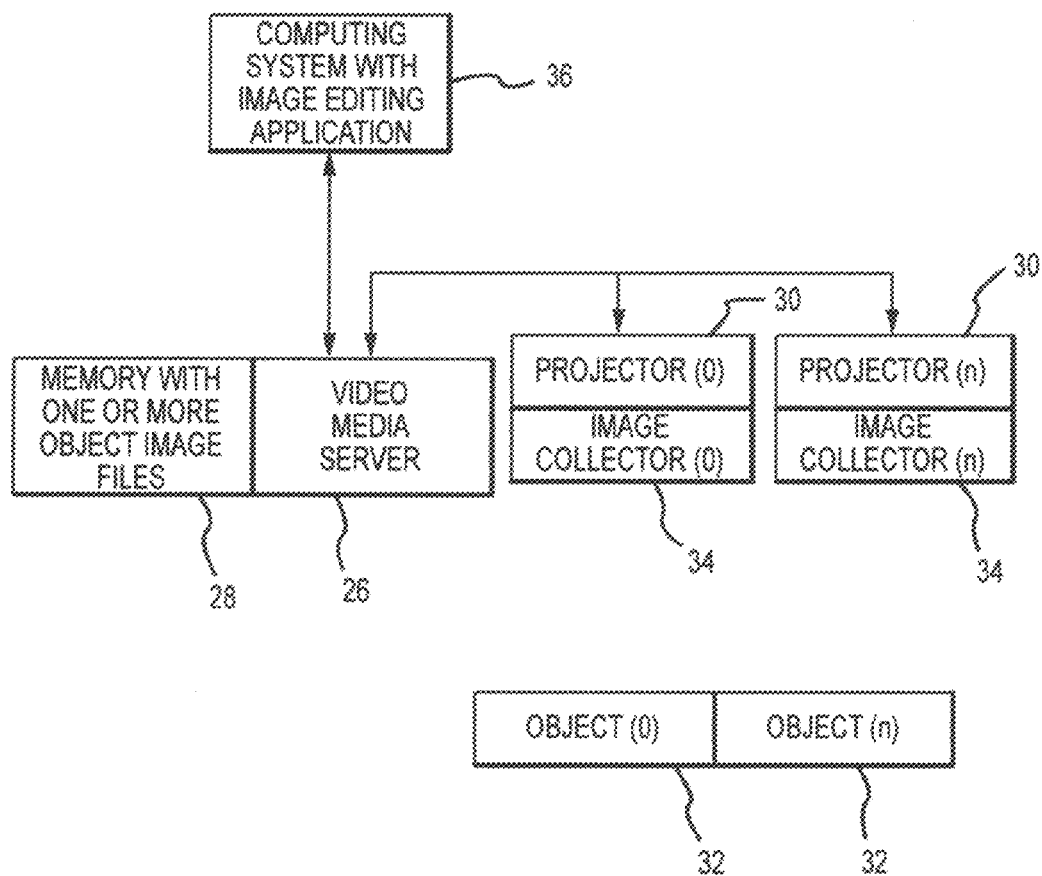
FIG. 4 is a system diagram of one example of a high dynamic range scenographic projection system.

The system of FIG. 4 includes a video media server 26 or other computing system capable of storing, such as with some form of memory 28 coupled with the server, and delivering an image, whether video image or a still image. The video media server is coupled with one more image projectors 30 (projector(0)—projector (n)) arranged to project patterned light or video images on an object 32 or scene in a field of view of the projector. The image projectors may be of various possible types, including, but not limited to a Panasonic 7700 series, 7000 lumen, 3 chip DLP. Smaller projectors of the type that may be used include Panasonic 5600 series 5000 lumen, single chip DLP.

The field of view of the projector is the area of the scene or image that the projector illuminates with a projected patterned image. The field of view may be altered with zoom techniques, whether optical or digital, as well as other projection techniques. Further, the projectors may have a specified resolution. For example, a projector may have a resolution of 1024 (pixel width)×768 (pixel height); however, other contrast and resolution ratios may be used. The projector has a projector lens, not shown. To obtain a scene/object image for projection on the scene, a camera which may be digital, or other form of image collector 34, is coaxially aligned with the projector to obtain an image of the scene with a similar field of view of the projector. It is possible to apply techniques discussed herein to a portion of a scene to use and blend the techniques with traditional methods.

Figure 5:
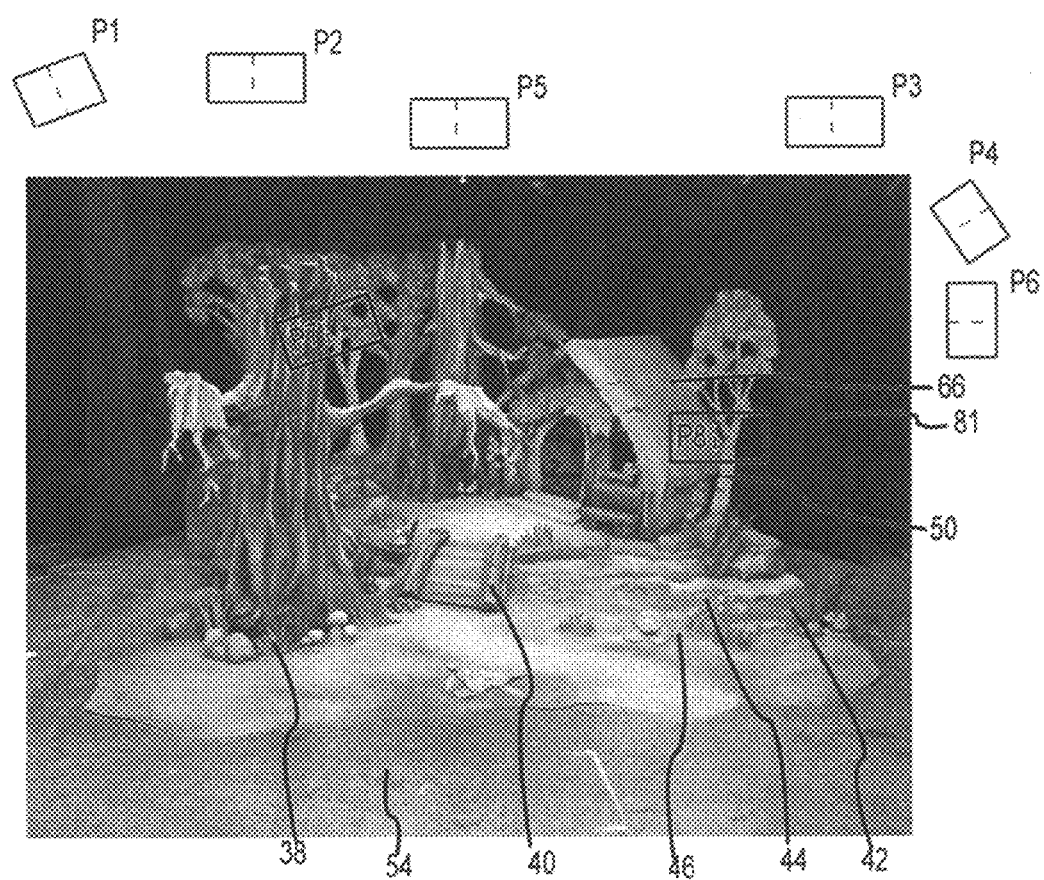
FIG. 5 is a digital photograph of a set of two and three dimensional objects employing one particular example of a scenographic projection system with eight projectors (P1-P8)

Referencing the system of FIG. 4, the method of FIG. 3 is now described. Besides referencing the system of FIG. 4, the method of FIG. 3 is also discussed with reference to various other figures. FIG. 5 is a digital photograph of a set of two and three dimensional objects employing one particular example of a scenographic projection system such as illustrated in FIG. 4, with eight projectors providing blended overlapping images of objects with the field of view of a given projector. The approximate locations of the projectors and their orientation relative to the set are shown as the rectangles labeled P1-P8. Each rectangle also includes a dashed line, illustrating the approximate axis of the projector lens. The photographic image of the set shown in FIG. 6 includes two and three dimensional objects, including a foreground three dimensional tree 38, a three dimensional bridge 40 over a painted stream (two dimensional) 42 with rocks 44 and a shoreline 46 along the stream, a cottage 48 and a two dimensional tree 50 next to the cottage.

The method of FIG. 3 begins with the operation of obtaining an image of an object or objects from a camera coaxially aligned with a projector (operation 300). The projector is arranged to project patterned light on the object. Obtaining such an image may first involve positioning the camera coaxially with the projector. By aligning the camera coaxially with the projector, the camera may obtain an image encompassing the field of view of the projector.

FIGS. 6A-6H illustrate the illumination of portions of the set from the eight projectors (P1-P8). The illuminations, besides illustrating the area and set objects within the field of view of any given projector, are also used in the process described below to register the digital image of the portion of the set in the field of view with the image that will be projected on the portion of the set.

Figures 6A, 6B, 6C:
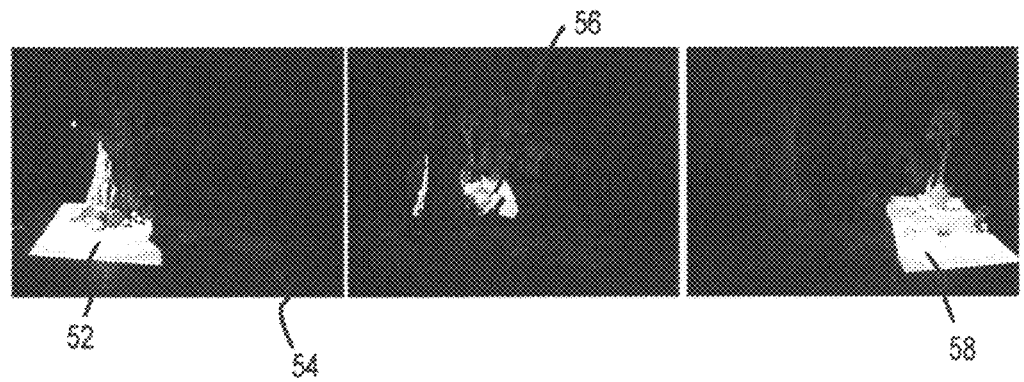
FIGS. 6A-6H illustrate the illumination of various portions of the set of FIG. 5, each image illustrating the illumination area of one particular projector.

FIG. 6A illustrates the illumination of a first portion 52 of the set, including a front and left side portion of the foreground tree 38, from the first projector (P1). The illuminated portion of the set illustrated in FIG. 6A corresponds with the field of view for the first projector. The field of view from the various projectors is generally rectangular. However, the techniques discussed herein may be used with a projector or other image projection device having different shaped fields of view, such as circular. In the example of FIGS. 5 and 6A-6I, the projectors are arranged to project on the set such that features of the set are covered by the field of view of at least one projector, viewing the set from the front as shown in FIG. 5. The projectors in the example of FIGS. 6A-6H are placed at various different orientations (angle with respect to ground and other projectors) and are arranged at different heights and relative distances between projectors. It can be seen from the angle of light shown on the foreground tree that the first projector (P1) is positioned above and to the left of the illumination area 52 such that the projection is at an angle relative to a floor 54 of the set.

Any given implementation can be different. For example, the orientation of the projector(s), the arrangement of projector(s), and the number of projector(s) may depend or otherwise be arranged depending on size of the performance space and the perspective of an audience viewing the set or object. For example, with respect to the set illustrated in FIG. 5, it is possible that the set would be viewed by an audience in a theater, an amusement park ride, or the like, where the audience, which may be one or more people, is not able to view the set from all possible orientations. For example, audience members might be prohibited from viewing the set of FIG. 5 from the back, and only be allowed to view the set from the front (the front of the set is the perspective shown in the photograph of FIG. 5). Hence, the projectors may be arranged to pattern illuminate various features of the set that would be viewable by audience members, whereas features of the set not viewable by the audience need not be illuminated by a projector.

FIG. 6B illustrates the illumination of a second portion 56 of the set, including a rear portion of the foreground tree, from the second projector (P2). The illuminated portion of the set illustrated in FIG. 6B corresponds with the field of view for the second projector. The field of view of the second projector is rearward of the first field of view, and the portions of the two fields of view overlap (e.g., the rear edge of the first field of view overlaps the front edge of the second field of view). To ensure that a certain area is illuminated and due to other factors, the field of view of two or more projectors may overlap. When two or more projections overlap, various image manipulations, as discussed in detail below, may be undertaken to cause any intended visual result, such as blending the overlapping areas such that there is little or no visual effect from the overlap. FIG. 6C illustrates the illumination of a third portion 58 of the set, including a portion of the stream 42 in the front right corner area of the set, from the third projector (P3). The illuminated portion of the set illustrated in FIG. 6C corresponds with the field of view for the third projector. The second and third projectors are generally perpendicular to the floor of the set.

Figures 6D, 6E, 6F:
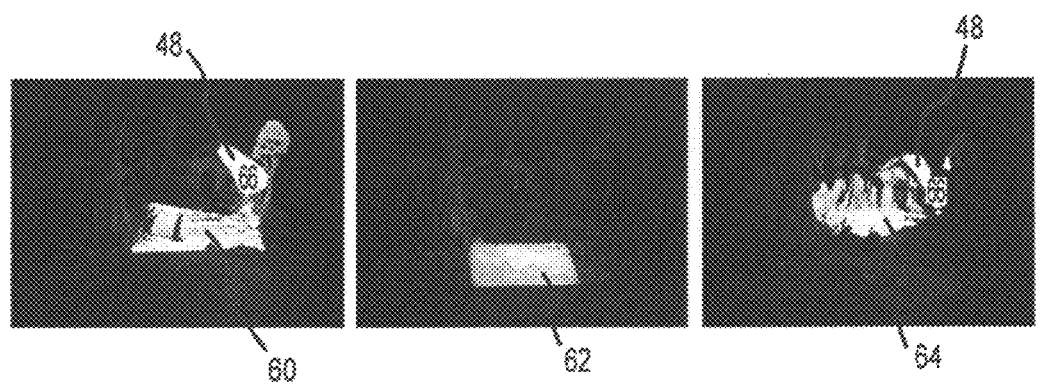

FIGS. 6D-6F illustrate the illuminations (60, 62, 64) from a fourth (P4), fifth (P5) and sixth (P6) projector, respectively. The fifth projector is positioned directly above the front center set (substantially perpendicular to the floor). The fourth and sixth projectors both illuminate portions of the cottage 48 from the right side of the set. It can be seen that the fourth projector illuminates a right side of a roof 66 of the cottage and a portion of the bridge, whereas the sixth camera illuminates the front of the cottage and an area to the left of the cottage along with some area in front of the cottage. The field of view of the fourth camera overlaps with the field of view of the sixth camera.

Figures 6G, 6H, 6I:
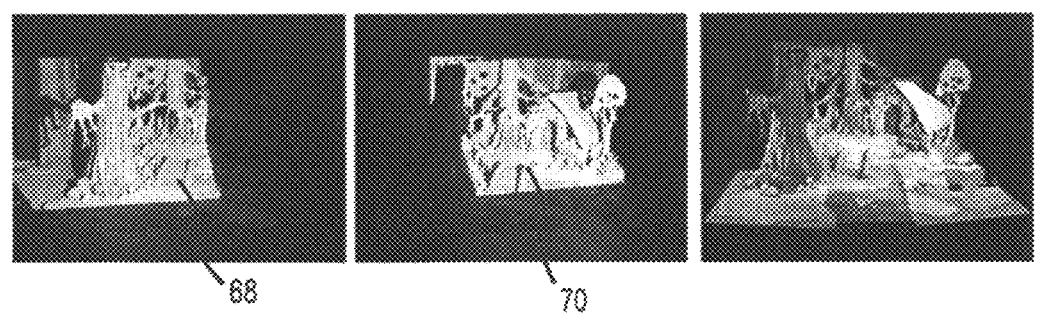
FIG. 6I illustrates the illumination areas, including the overlapping areas of illumination for each projector on the set of FIG. 5.

FIGS. 6G and 6H illustrate the illuminations (68, 70) from a seventh and an eighth projector, respectively. The projectors are positioned forwardly of the set, and have larger fields of view compared with the other projectors, as shown by the larger relative size of the illumination areas of the seventh and eighth projectors compared to the illumination areas of the first through sixth projectors. To achieve a larger field of view, the seventh and eighth projectors are placed at a greater relative distance from the set and object features within the field of view as compared to the first through sixth projectors. Hence, the pixel level resolution of the projection from the seventh and eight projectors will be less than those projectors placed closer to the set.

Finally, FIG. 6I illustrates the set illuminated by all of the projectors. It can be seen that various illuminations areas overlap, and that most of the features of the set are illuminated by at least one projector, and many features are illuminated by more than one projector. There are some areas that are not illuminated, e.g., there is a small shadow under the right front side roof line of the cottage.

Figure 7:
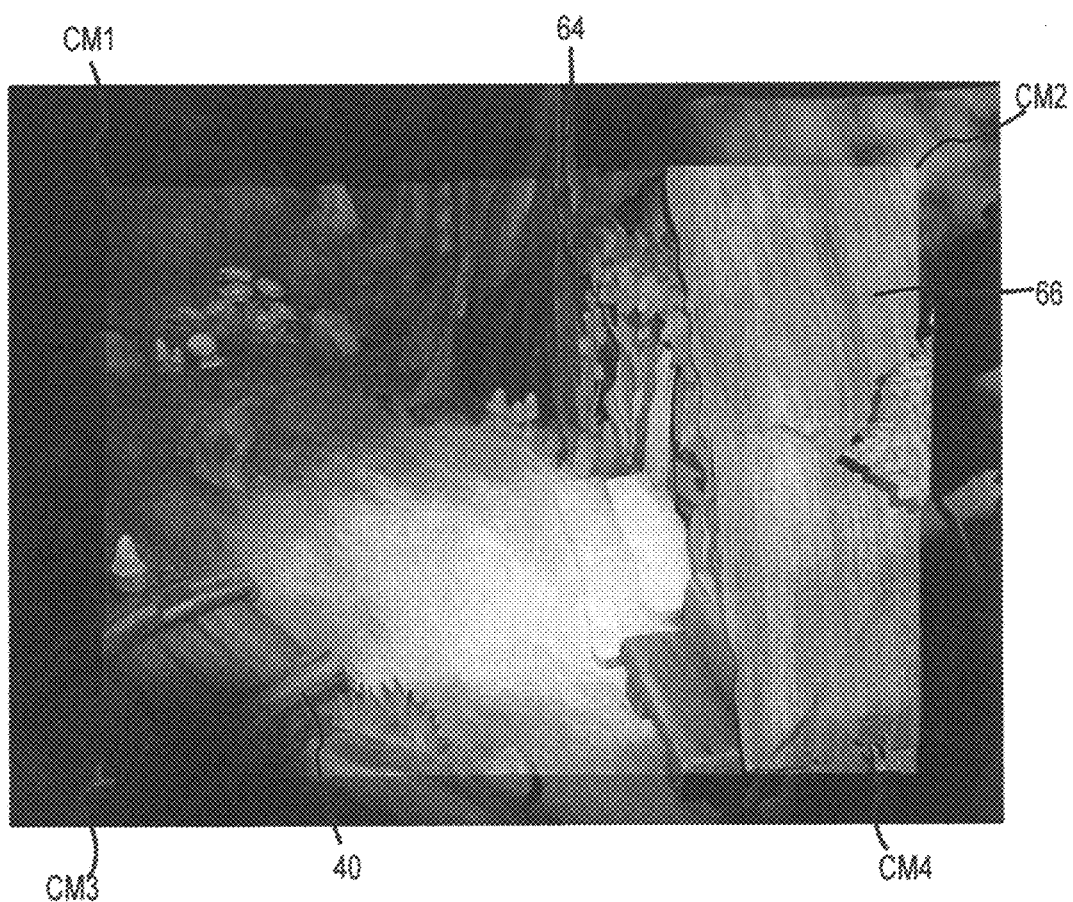
FIG. 7 illustrates the illumination area of the sixth projector of FIG. 6F viewed from the orientation of the projector.

To obtain an image of an object for purpose of high dynamic scenographic projection, the illumination areas of each projector may be marked to allow the camera field of view to be aligned and sized with the projector field of view. For example, FIG. 7 illustrates the illumination area 64 of the sixth projector (P6, FIG. 6F) viewed from the orientation of the projector. In this example, a feature of the set at the corners of the illumination area is marked. For example, if the lower left corner of the illumination area, a marker (corner marker CM3) is placed on a portion of the bridge 40, and in the upper right corner a marker (corner marker CM2) is placed on the roof 66 of the cottage 48. Various possible markers may be used, including tape (used in FIG. 7), reflectors, infrared emitters, and so forth. Marking may be eliminated in the event some other method, whether automated or manual, is employed to generate an image of the field of view for the projector.

Figure 8:
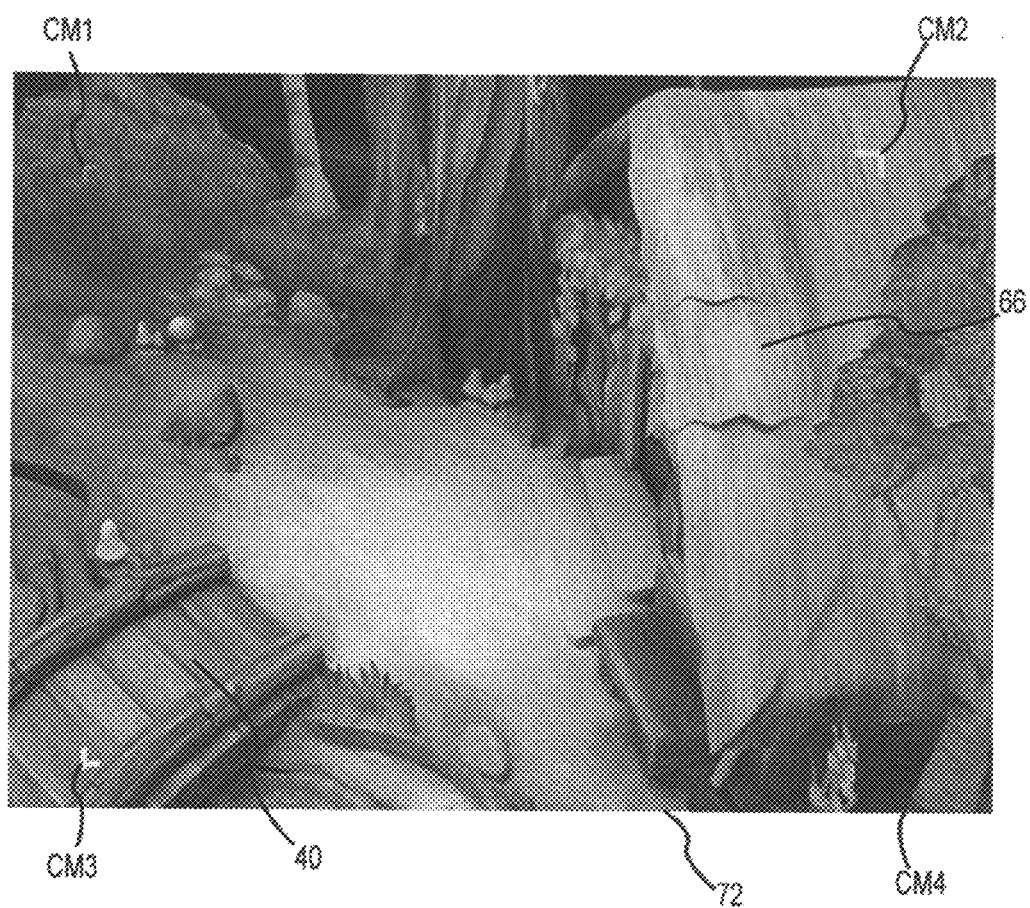
FIG. 8 illustrates an image from a digital camera coaxially aligned with the sixth projector, and further illustrating corner markers of the field of view of the sixth projector.

Once the field of view of the projector is identified, the digital image may be taken of the object(s) within the field of view of the projector. In one particular method, a digital camera is positioned in coaxial alignment with the projector. The camera is coaxially aligned to minimize distortion and keystone of the image relative to the projector field of view. The camera is positioned such that the image taken from the camera can project on the same field of view of the projector. FIG. 8 illustrates an image 72 from a digital camera coaxially aligned with the sixth projector. It can be seen by the tape corner markers (CM1-CM4) of the projector field of view, that the field of view of the digital camera is slightly larger than projector field of view. Hence, an image of the scene within the field of view of the projector is obtained (operation 300).

In one example, a camera image may be taken so that the nodal point of both lenses are co-located. This is usually difficult since the nodal point is normally located within the lens elements. However, a beam splitter or removable mirror may be employed to get the camera's reflected nodal point co-located with the projectors nodal point. In such a case, the longer the throw of the projector, the less need for co-location of nodal points. Satisfactory image alignment is possible without co-location of nodal points for projector throws of 10-15 feet or more.

Next, the image may be manipulated so that the image size substantially matches the projector field of view (operation 310). In this way, the image projected from the camera will fall within the field of view of the projector, and projected image features will fall on or very near the actual image features. Hence, the projected pattern or portion thereof will substantially align with the object surface patterns (e.g., within 8 pixels). Various actions including cropping, rotating, and skewing may be performed or otherwise obtained to cause the image to substantially match the projector field of view. In one example, substantially matching means that the border of the image is aligned with the border of the field of view of the projector within about 0-8 pixels, as discussed above.

Other alignment ranges are possible to achieve the high dynamic effect. For example, much greater misalignment may be possible when the projected image and the object have a consistent color. Take for instance a large consistently blue object, misalignment will simply result in a blue image being projected on the blue object, and will still achieve the high dynamic effect across much of the object. Image misalignment that negatively impacts the high dynamic effect may be also be a function of misalignments of hue, with greater spectral variations of hue being projected on a hue having more of a negative impact on high dynamic effect than lesser spectral variations. For example, misalignment that results in projecting 480 nm blue light on a 470 nm blue surface may generate an acceptable high dynamic effect, whereas projecting 700 nm red light onto the 470 nanometer blue surface may be unacceptable for the high dynamic effect.

Any miss-alignment due to pincushion, fisheye distortion, or irregularities in the lenses may be corrected to some extent using warping techniques that apply non-linear transformations to the captured image. Acceptable error can be calculated, assessed and/or adjusted from viewer distance and visual acuity combined with projector resolution and size of projected area.

Figure 9:
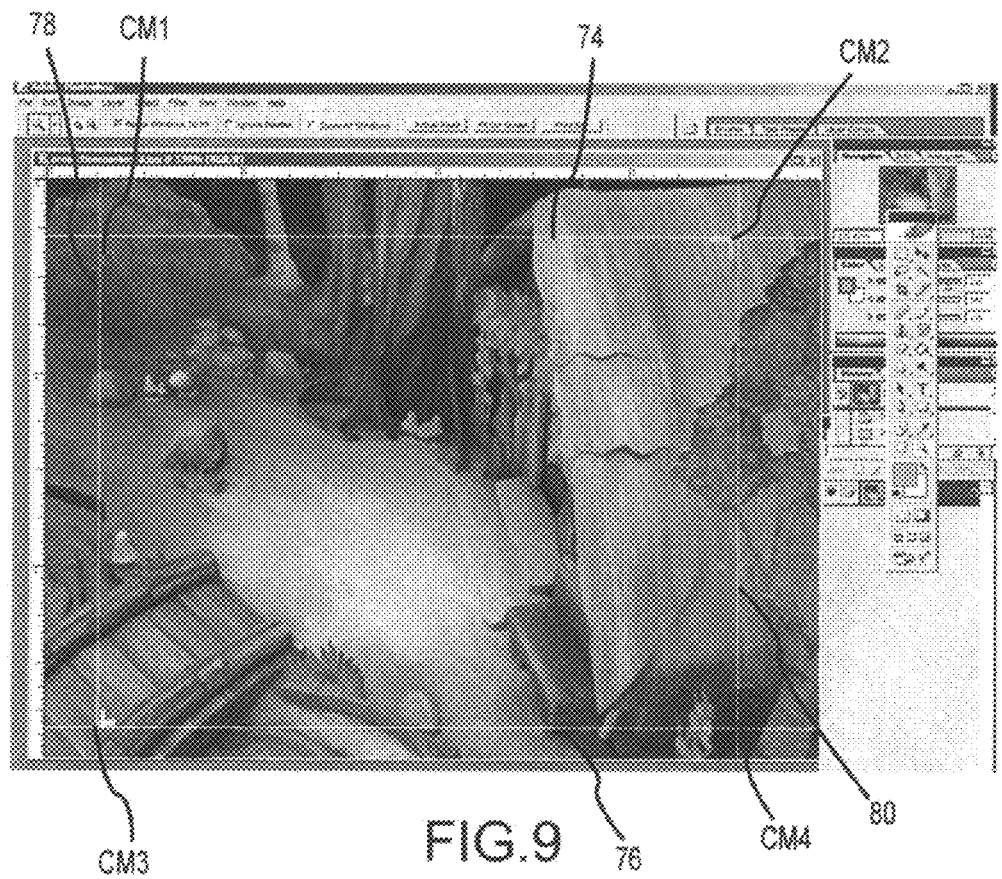
FIG. 9 illustrates the raw image of FIG. 8 being cropped at the corner markers of the field of view of the sixth projector.

In one example, the raw image is loaded in an image editing program 36 (FIG. 4), such as Adobe Photoshop® and the image is cropped to the corner markers. FIG. 9 illustrates the raw image of FIG. 8 being cropped at the corner markers of the field of view of the sixth projector. Photoshop is a trademark or registered trademark of Adobe Systems Incorporated in the United States and other Countries. Within the image editing program, crop lines 47 (upper), 76 (lower), 78 (left) and 80 (right) are defined. After cropping, a resulting cropped image will have an outer boundary at the crop lines.

Due to slight coaxial misalignment between the camera center line and the projector center line, it can be seen that the image cannot be precisely cropped at the edges of the field of view of the projector. Note, the zoom lens of the camera may have a different ratio than the projection lens resulting in different optical performance characteristics. For example, the upper left side corner marker (CM1) is slightly lower than the upper left corner at the intersection of the left and upper crop lines (78, 74), whereas the lower right side corner marker (CM4) is slightly higher than the lower right corner at the intersection of the lower and right crop lines (76, 80), whereas the lower left and upper right corner markers (CM3) and (CM2) are positioned at the corners created by the crop lines (76, 78) and (74, 80).

Figure 10:
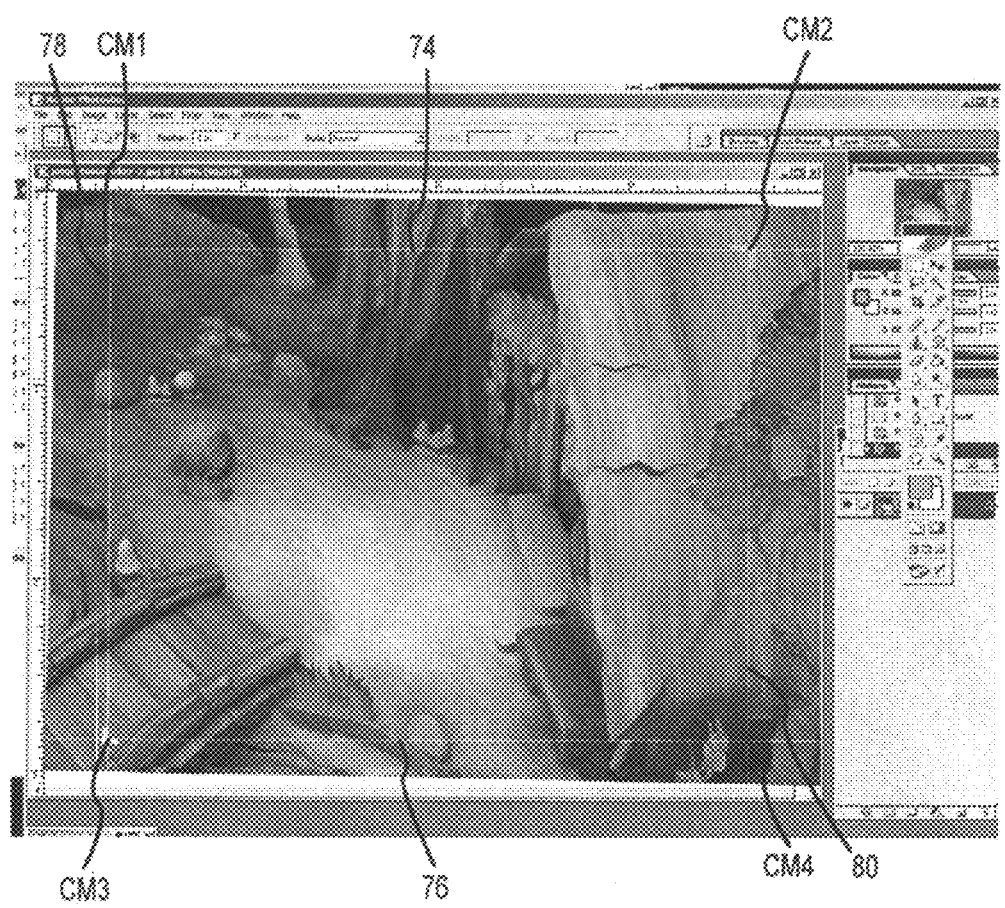
FIG. 10 illustrates image correction by way of correcting skew and rotation to align the cropped image with the field of view of the projector.

When there is such a coaxial misalignment, and the cropped image does fit precisely within the field of view of the projector, the image may be rotated, skewed, or otherwise adjusted so that the corner markers are positioned at the associated corners of the crop lines, as shown for example in FIG. 10. In FIG. 10, it can be seen that the image has been rotated and slightly skewed so that upper left corner marker (CM1) is positioned at the upper left intersection (corner) between the upper and left side crop lines and the lower corner marker (CM4) is positioned at the lower right intersection (corner) between the lower and right side crop lines. In this example, the cropped image will be the product of cropping, as well as rotation and/or skewing.

Figure 11:
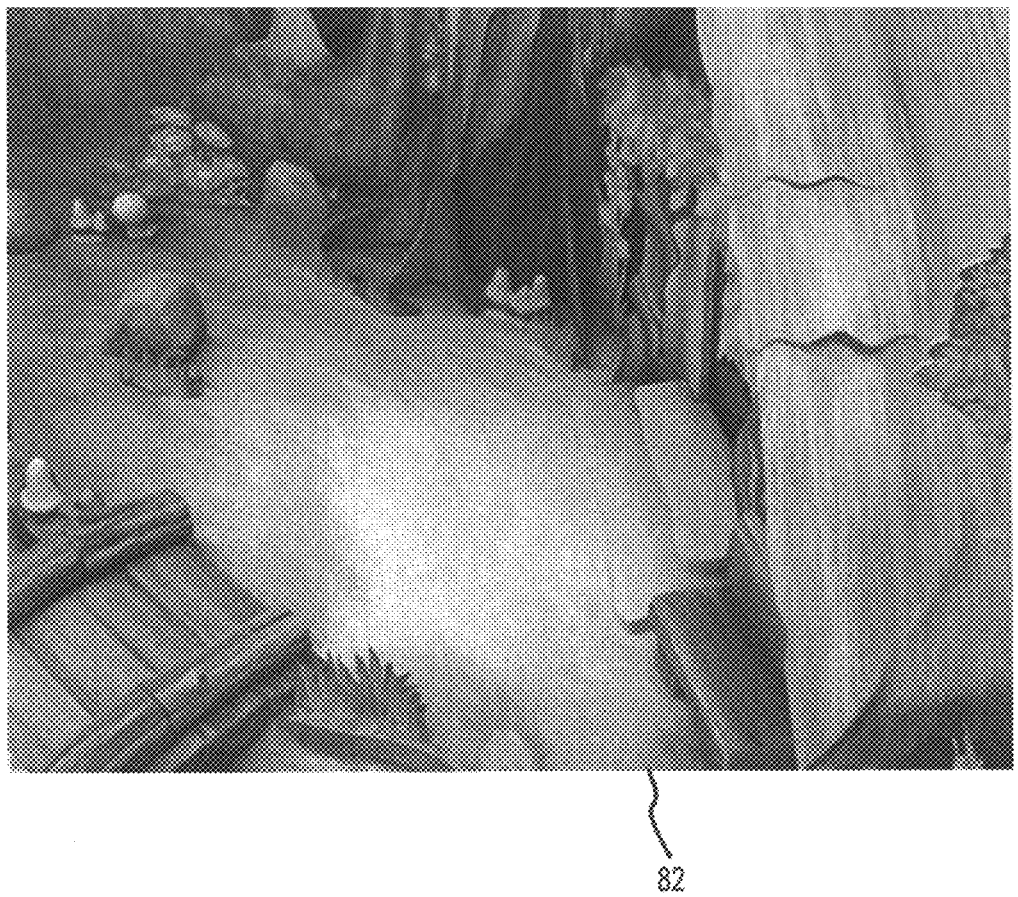
FIG. 11 is a scaled image of FIG. 9, the scaling being performed after crop, rotation and skew so that the resolution of the image matches the resolution of the projector.

After the image is cropped, rotated and skewed (should any or all of those operation be undertaken), the image may further be scaled to match the resolution of the projector (operation 330). For example, the sixth projector has a resolution of 1024×724, and the image 82 of FIG. 11 is the image of FIG. 9 (after crop, rotation and skew) scaled to 1024×724. Scaling the image such that it matches the resolution of the projector causes a one-to-one correspondence between image pixels and projector pixels. Any color correction of the image may be performed after scaling.

The prepared image may be saved as a template for the associated projector, after which further image processing may be performed to create various possible visual and non-visible effects (operation 340). In one example, the prepared image is saved as a raw image file, with no compression, to facilitate subsequent image alteration operations that might be complicated due to compression techniques and the resultant image alterations from such compression techniques.

The prepared image 82 is then loaded in the video media server 26 (operation 350) and projected on the set through the projector 30 (operation 360). In the case of a system with more than one projector, the process of image preparation (operations 310-330) may be performed for each projector.

As an alternative approach to the operations set out above, some operations may be performed using a tool such as Adobe® After Effects®. The After Effects program, installed on a computer, can be directly connected to the projector and the output scaled and adjusted in real-time or near real-time.

Referring again to operation 340, a first type of image alteration that may be performed is color correction. The color corrected image or the raw prepared image may be projected on a given object. Various issues may prompt color correction of the raw image, such as spectral shifts caused by the illumination light source(s) for the original image and color shifts between projectors. The original paint coating may not represent the original design intent and thus can be color corrected at this phase. Additionally, conventional metal halide projectors may not have consistent color characteristics with different projectors, even when being the same make, model, and age. Such color differences may be caused by lamp life, manufacturing inconsistencies, etc. These color differences may cause slight spectral shifts in the projected images from each projector. Hence, the image projection from different cameras might be noticeable to a viewer without color correction. For example, if projections from projectors with different color characteristics are projected on a scene side-by-side, overlapping boundaries of the two projected images would be viewed as a color shift between the two projected images. Color correction may result in a color corrected image in the form layer on the raw image (after cropping, skewing, and scaling). In one example, color correction, blended images (discussed below) and other base or raw image alterations are created as independent layers in Adobe® Photoshop® so they can be edited and adjusted as required without affecting the base image template. Color corrected images would likely be obtained for each projector.

After color correction of all projected templates is complete or irrespectively of color correction, it is also possible to blend the image projections that overlap. In one example, the process may be manual, and may thus involve a digital artist blending the multiple overlaps of all of the projectors using an image editing program 36. Blending may also be automated. In the manual process, the blends are created in an iterative process, working back and forth between adjacent projectors until a seamless performance environment is obtained. Blending may thus result in a blended image in the form of a blended layer on the color corrected image. Blended images would also likely be obtained for each projector in a system with a plurality of projectors.

In a sophisticated multi-projector, three dimensional environment, like that shown in FIG. 5; when all of the media templates are aligned, color corrected and blended, additional production techniques may be employed to enhance the appearance of the projected environment. For example, theatrical lighting techniques may be applied to create another layer. This process may be manual or automated. In a manual process, a theatrical lighting designer may generate images of "lighting" effects that would normally occur during a traditional production. Lighting may involve shading and coloring the environment. However, unlike putting gel in a theatrical fixture, lighting may be applied at a pixel level with respect to each patterned image projection (for each projector) as well as between (in combination) image projectors. The lighting designer may work directly with a media designer to shade and color the environment. It is possible to introduce real lighting to further enhance the projected environment. Using digital tools, such as Adobe Photoshop and Adobe After Effects, the designers can assign shadows and patterns digitally. This allows the designer to create a sense of time, composition and space at a level never before available to a lighting designer. Working at a pixel level, the designer can adjust color, contrast, hue and shadow. In conventional theatrical lighting, the lighting designer must select colored gels for the fixtures so that the colors compliment the scenic paint. These gels, "tint" all of the scenic paint and although beautiful lighting can be created, it has limited range in terms flexibility. Additionally, these "tinted" sources limit the contrast and saturation of different parts of the visible spectrum as they hit all surfaces at once. Shadows are limited to static "Gobos" or patterns installed in the light fixtures. At best, these conventional metal or glass patterns can be rotated to simulate motion.

Besides reprojecting a pattern image in registration on an object surface corresponding to the pattern image, the pattern image may further be manipulated to perform numerous possible visual affects by altering the pattern image. With a video pattern image, shadows may be automated. For example, referencing FIG. 5, it is possible to generate animated shadows of the branches of the trees, and move the animated shadows to simulate a windy day. Lighting may be added to the scene, and each pattern image may be altered to flash to a brighter hue when the lighting strikes, and similarly shadows may flash in the proper positions. It is possible to manipulate the perceived direction of light in a scene, whether from a perceived sun, street lamps, and the perceived direction may change, such as an affect of car headlights passing by. Conventional lighting techniques use real lights falling on objects in a predictable and familiar way. New techniques discussed herein may provide for non-realistic, artistic lighting effects such as seen in paintings, and animated films, to be applied to a scene, object, etc.

FIG. 5 also illustrates a scrim fabric 81 positioned in a semi circle behind the cottage 48 and other features of the set. Scrim fabric is commonly used in theatrical stage productions to achieve various lighting and visual, effects. Essentially, the term scrim fabric refers to some form of material, often fabric, with a series of small holes across the surface of the fabric, much like a window screen. A forest scene is painted on the scrim fabric shown in FIG. 5. In conventional theatrical lighting, lights projected on the front of the fabric can be used to make whatever scene is painted onto the scrim appear, and when the light is removed or some feature behind the scrim fabric is illuminated, the scene painted on the scrim becomes substantially less visible to the viewer, and the scene behind the scrim becomes visible. In accordance with embodiments discussed herein, it is possible to project an image of the scrim onto the scrim to cause the scrim scene to have the high dynamic effect. Removing the projection and illuminating a scene behind the scrim has a more dramatic visual distinction as compared with conventional lighting techniques because the scrim colors are far less bright, there is less contrast, etc., when conventional lighting of the scrim is compared to high dynamic illumination of the scrim.

Figure 12:
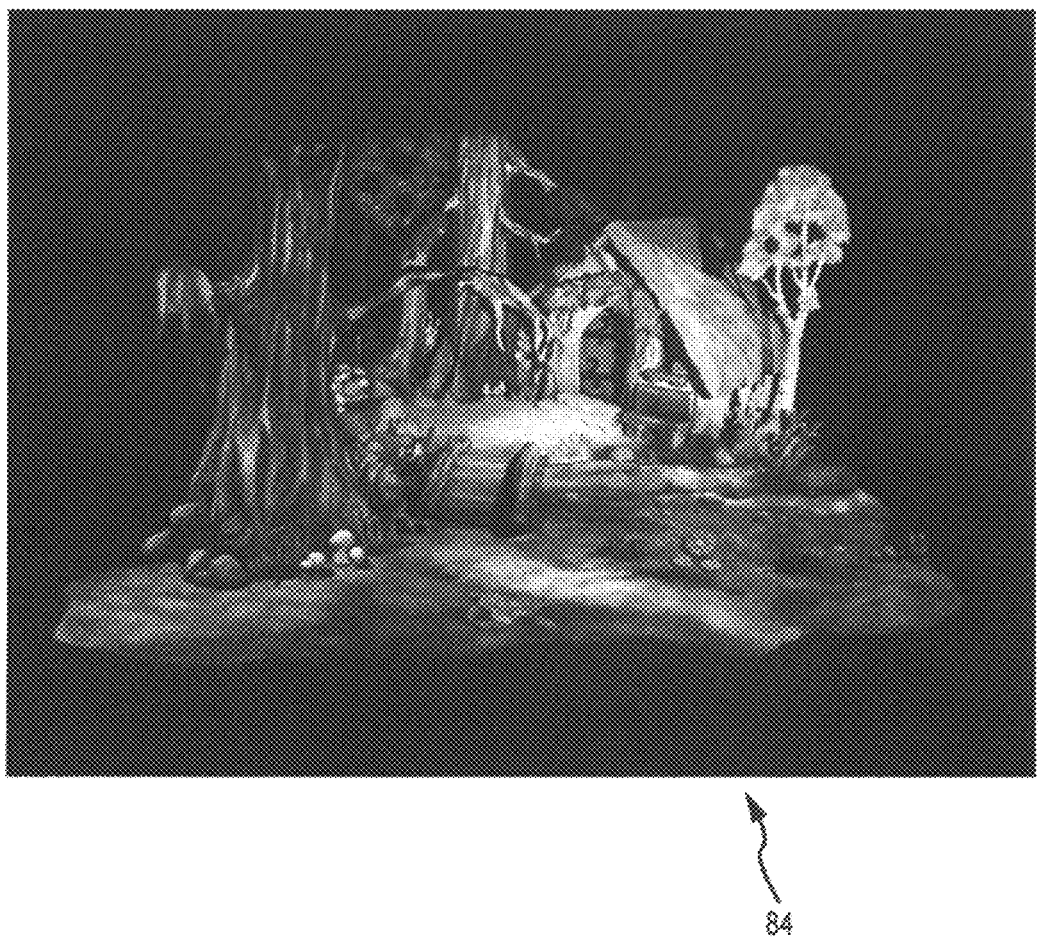
FIG. 12 is a photograph of the scene of FIG. 5 with the eight projectors of FIGS. 6A-GH projecting an inverted pattern image on the set, causing the set to appear primarily black and white with some muted color.

It is also possible to project the digital image in such a way that will cancel the reflected color of the object. For example, by inverting the digital image hue, such as with Adobe Photoshop, the projected pattern cancels the values of the object pattern. Such a technique would allow the visual affect of causing an object in full color to appear to turn black-and-white when the inverted image is projected in alignment on the object. FIG. 12 is a photograph 84 of the scene of FIG. 5 with the eight projectors of FIGS. 6A-GH projecting an inverted pattern image on the set, causing the set to appear generally black-and-white, with some muted colors (decreased saturation). In this case as well as in other implementations discussed herein, the reprojection of the image of the object on the object mutes the visual appearance of the object such that the reflected light is muted compared to the light reflected from the surface directly (without reprojection). Inverse luminance may also be projected on a scene, set, object, etc., causing a dramatic decrease in contrast, muting the edges of objects and hiding textures and patterns. Dimensional objects may be made to appear flat. Combining inverse hue and inverse luminance is an effective way to initially hide a dimensional scene for a dramatic transition (with hue projected on hue) into a dynamic range enhanced look.

Figure 13A:
FIGS. 13A and 13B show a progressive submersion effect of the set of FIG. 5 by way of projecting a progressive blue color on the set.
Figure 13B:

Special effects may be applied over the entire set using conventional effects software such as Adobe After Effects. In the example of FIGS. 13A and 13B, the set (FIG. 5) was made to appear to be slowly submerged in water as a patterned blue image 86 was projected on the set to in a way that the image rises up across the set. In fact, moving video effects can be applied to any part of the environment. In the case of the stream 42 shown in FIG. 5, for example, moving water may be projected from the projectors with a field of view covering the stream and seamlessly blended. The water will exhibit depth, turbulence and motion, the water may appear to "swirl" around the physically sculpted rocks that are shown in the stream bed.

Figure 14:
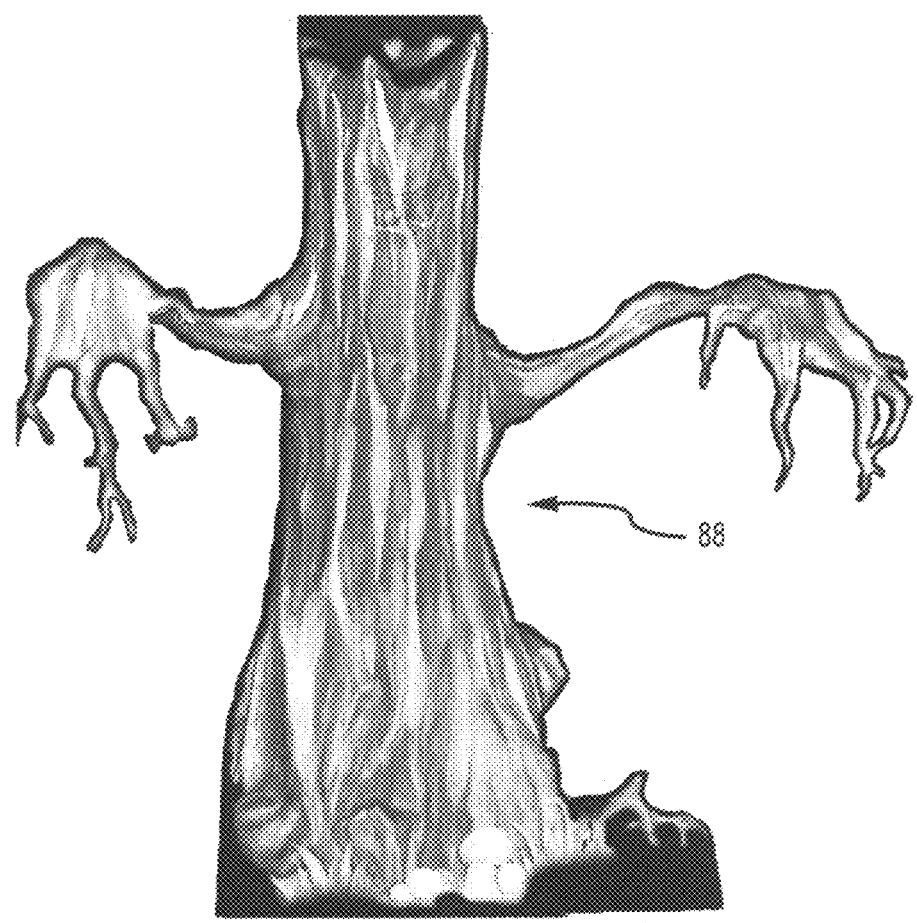
FIG. 14 illustrates a digital image of the foreground tree of FIG. 5.
Figure 15:
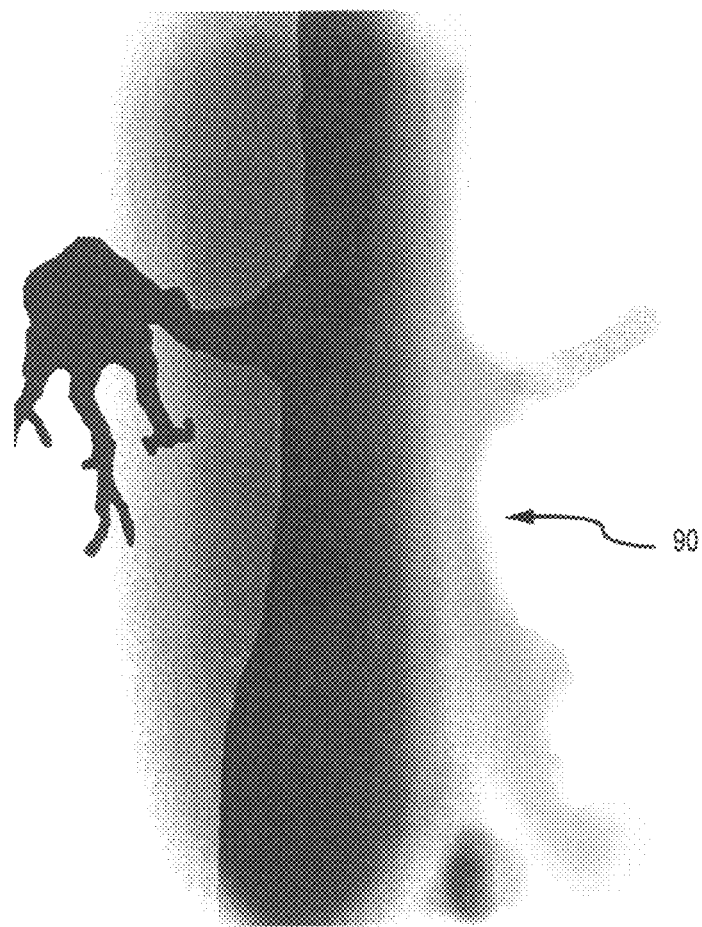
FIG. 15 illustrates a lighting layer for use with the base tree image of FIG. 14.

Examples of other visual alteration techniques of masking and color manipulation are shown in FIGS. 14-19. First, FIG. 14 illustrates a base image 88 of a tree (a photograph of the foreground tree 38 of FIG. 5 taken from the front of the tree). FIG. 15 illustrates a lighting layer 90 for use with the base tree image of FIG. 14. The layer was created in Photoshop and saved as an alpha channel. The colors represent the lighting designer's creative input on how to possibly light the tree. The digital artist airbrushed the tree to show the cool side (left) and the warm side (right) per the lighting designer's direction with the intent that the sun would be from the right. This is an example of the transition of conventional theatrical lighting to the digital world. Basically, moving from light fixtures with colored gels that illuminate the entire set to a digital video version that illuminates exactly where the designer needs light, down to a pixel level. These base images of the tree may be projected on the tree in accordance with implementations set forth herein to further enhance the high dynamic effect or independently of the high dynamic effect.

Figure 16:
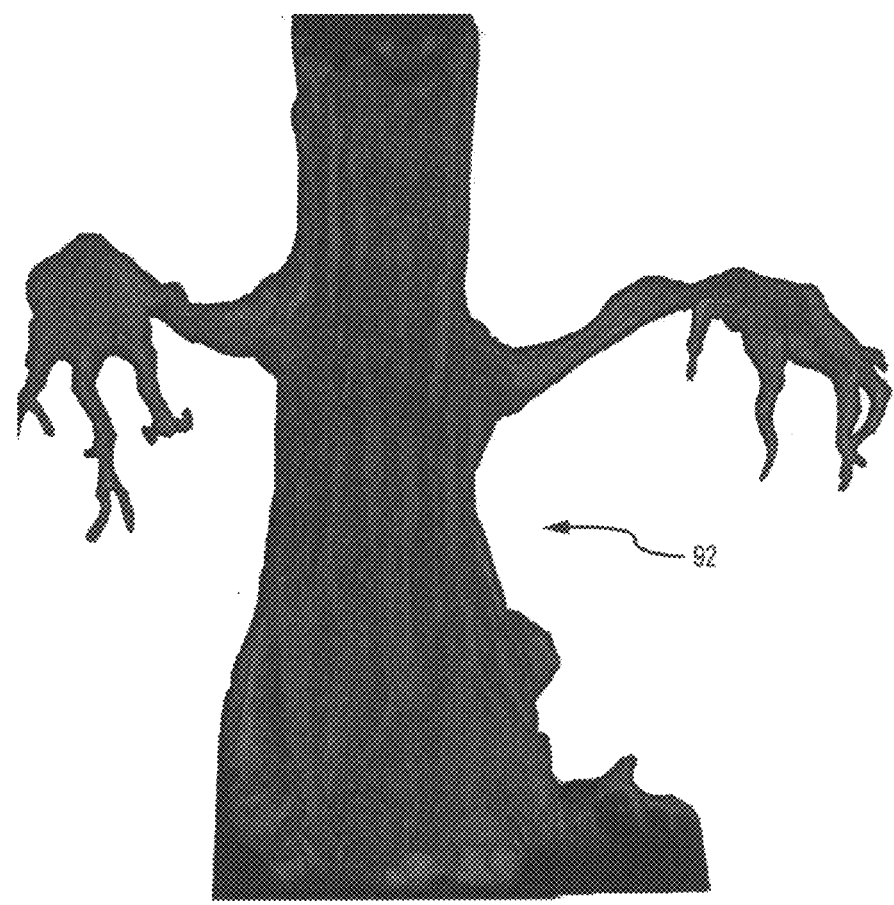
FIG. 16 illustrates a pattern image layer for use with the base tree image of FIG. 14, the pattern image to achieve a night time dark and stormy blue rendition.

FIG. 16 illustrates a pattern image projection 92, which may be stored as a separate image layer of the base tree image 88, to achieve a night time dark and stormy blue rendition. The FIG. 15 image might be used to project an image of the tree on the tree to achieve a sunrise or sunset coloring of the tree, together with or independently of also projecting a color image of the tree on the tree. The FIG. 16 image, on the other hand, might be used to achieve a night coloring of the tree. It should be noted that the tree images (88, 90, 92) are trimmed to the edge of the tree set piece.

Figure 17:
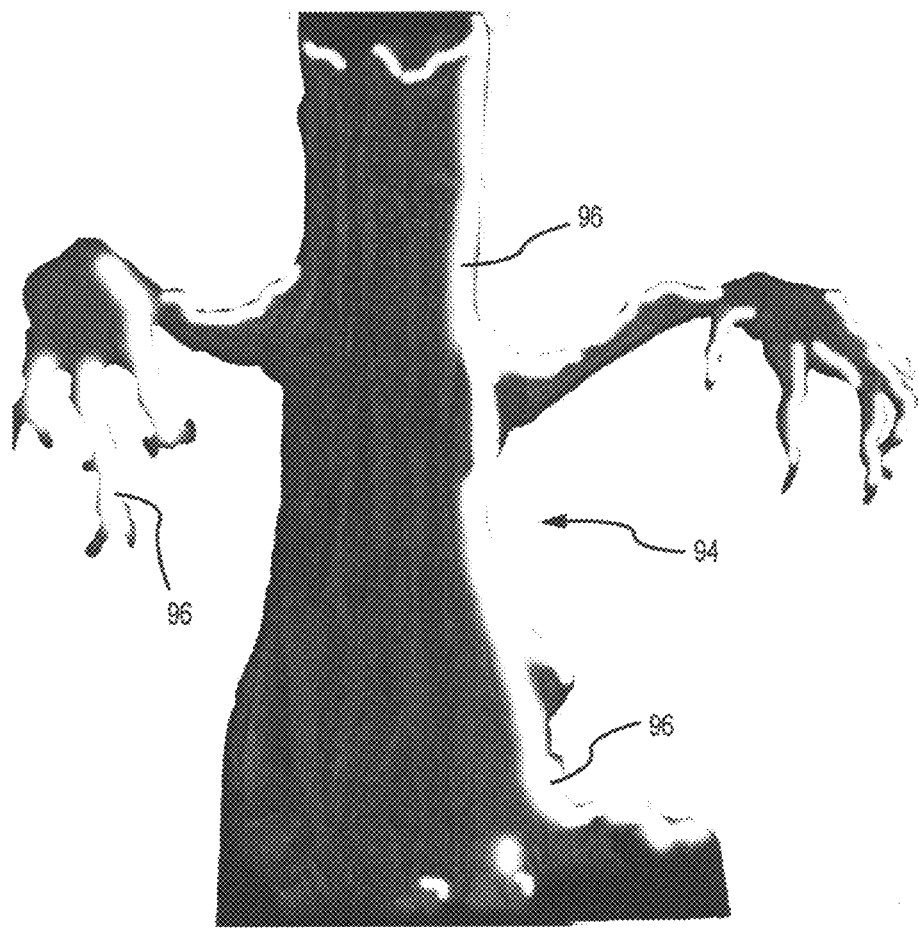
FIG. 17 illustrates a lightning layer for use with the pattern image of FIG. 16, the lightning layer intend to provide a visual effect of a lightning sequence.
Figure 18:
FIG. 18 illustrates a projection of an image of the illumination area of the projector onto the scene as shown in FIG. 6H.
Figure 19:
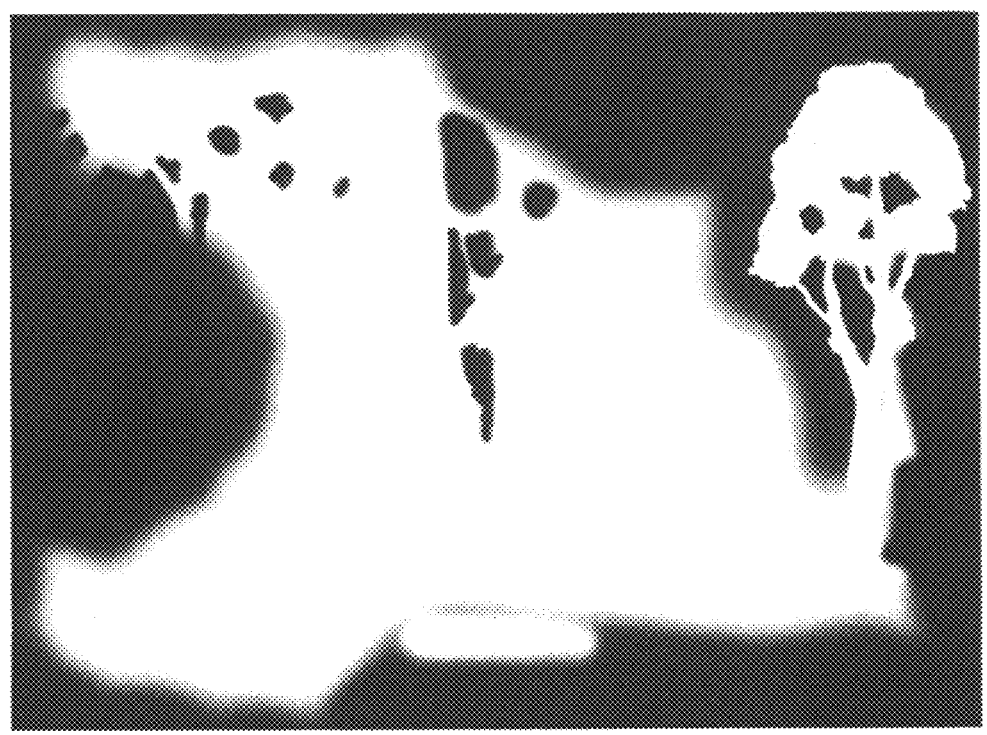
FIG. 19 illustrates a soft edge blending mask applicable to the image for the set of FIG. 18 and FIG. 6H.
Figure 20:
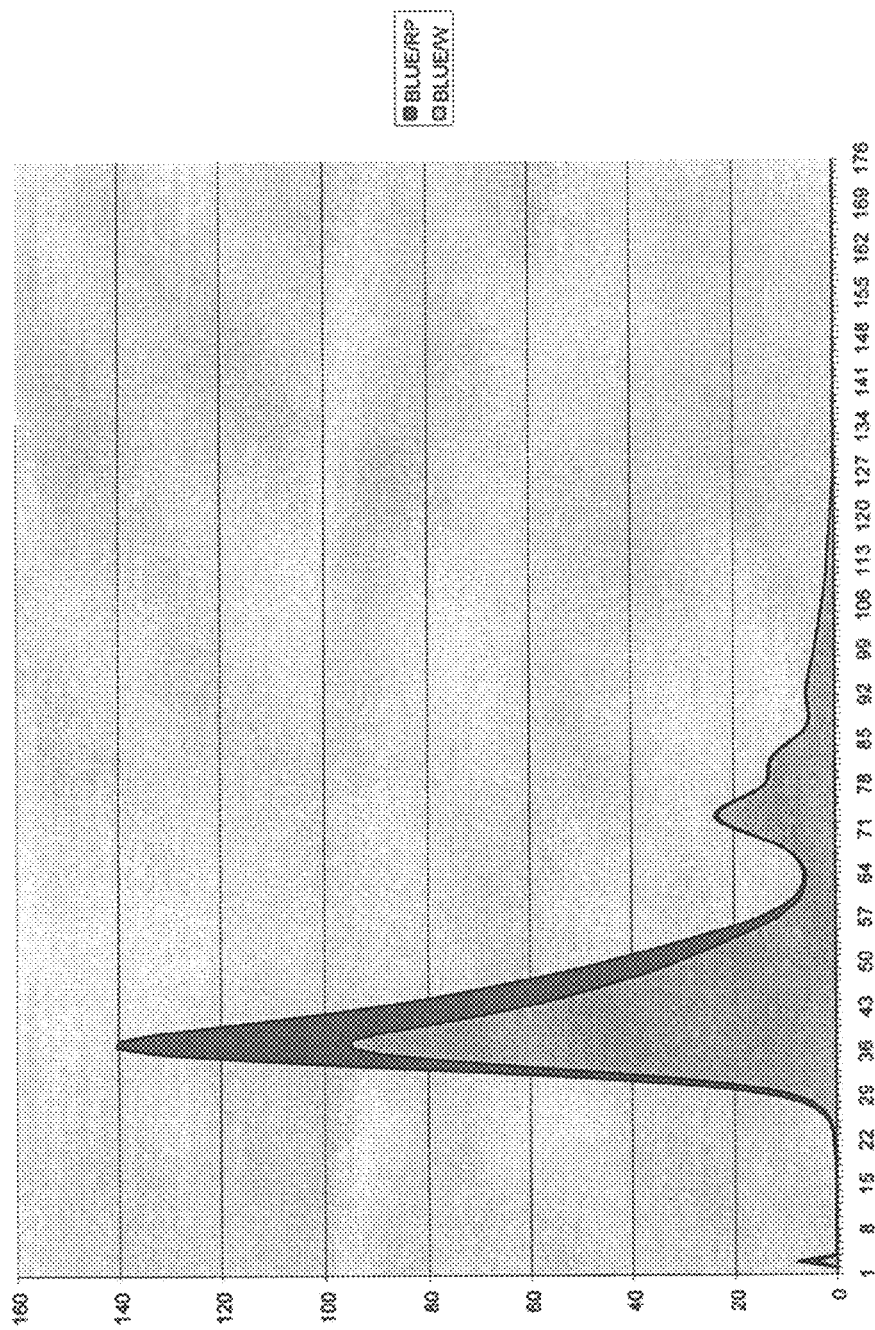
FIG. 20 is a graph comparing the photonic quantity measurement from a photometer for a blue Macbeth chart sample measured under white light compared to the photonic quantity measurement for the blue Macbeth chart sample measured with an image of the blue sample reprojected on the blue sample.
Figure 21:
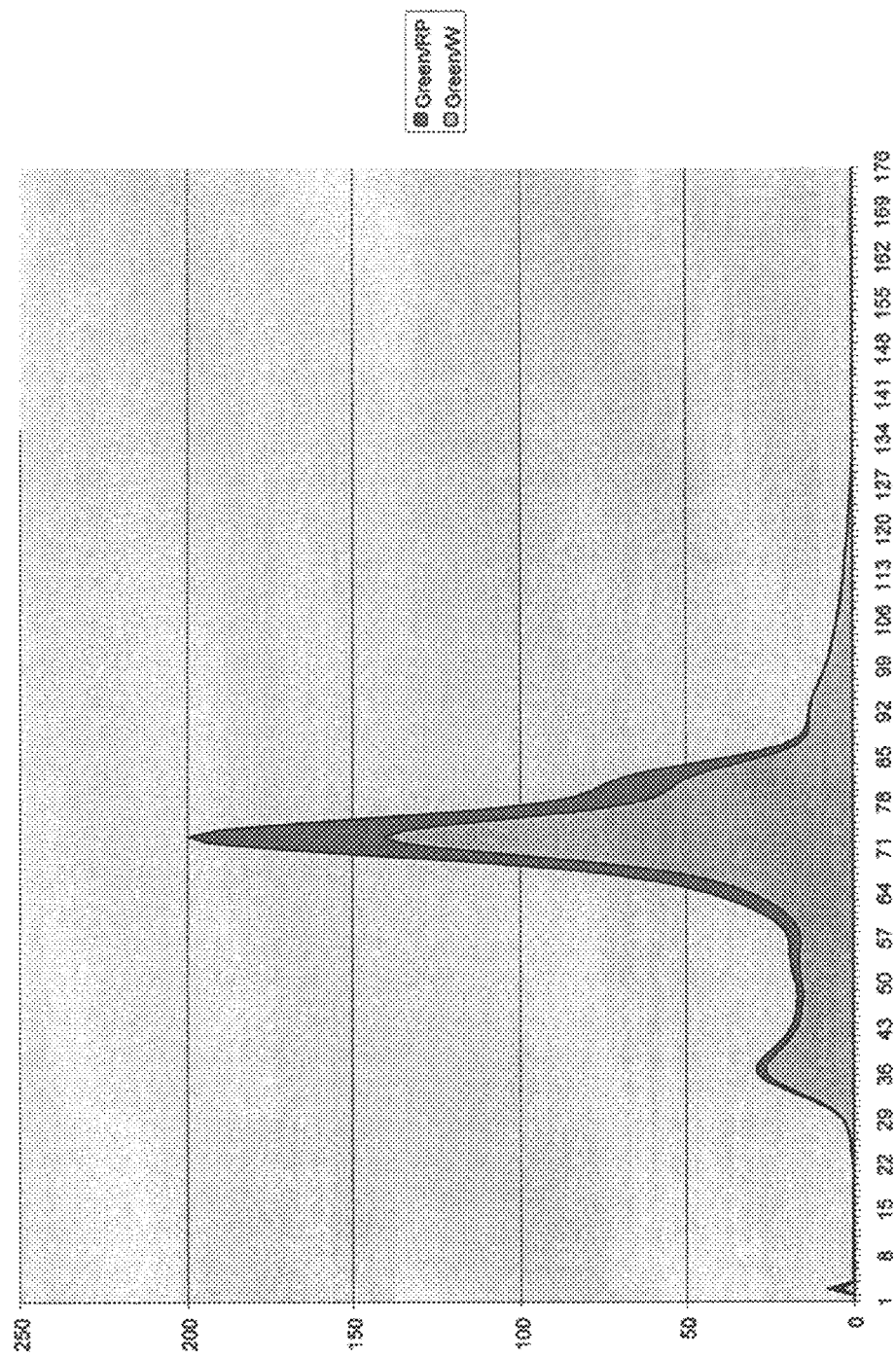
FIG. 21 is a graph comparing the photonic quantity measurement from a photometer for a green Macbeth chart sample measured under white light compared to the photonic quantity measurement for the green Macbeth chart sample measured with an image of the green sample reprojected on the green sample.
Figure 22:
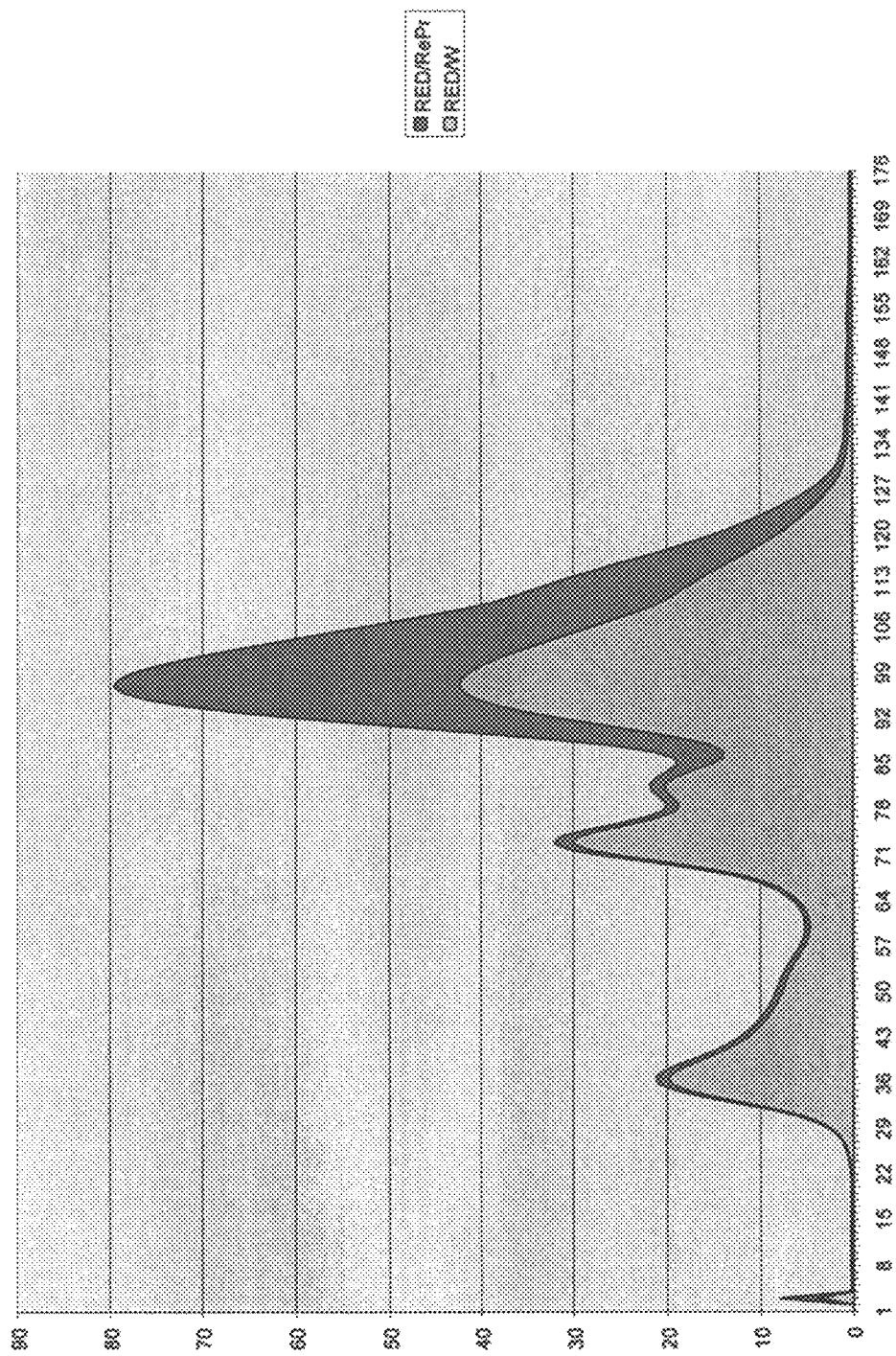
FIG. 22 is a graph comparing the photonic quantity measurement from a photometer for a red Macbeth chart sample measured under white light compared to the photonic quantity measurement for the red Macbeth chart sample measured with an image of the red sample reprojected on the red sample.
Figure 23:
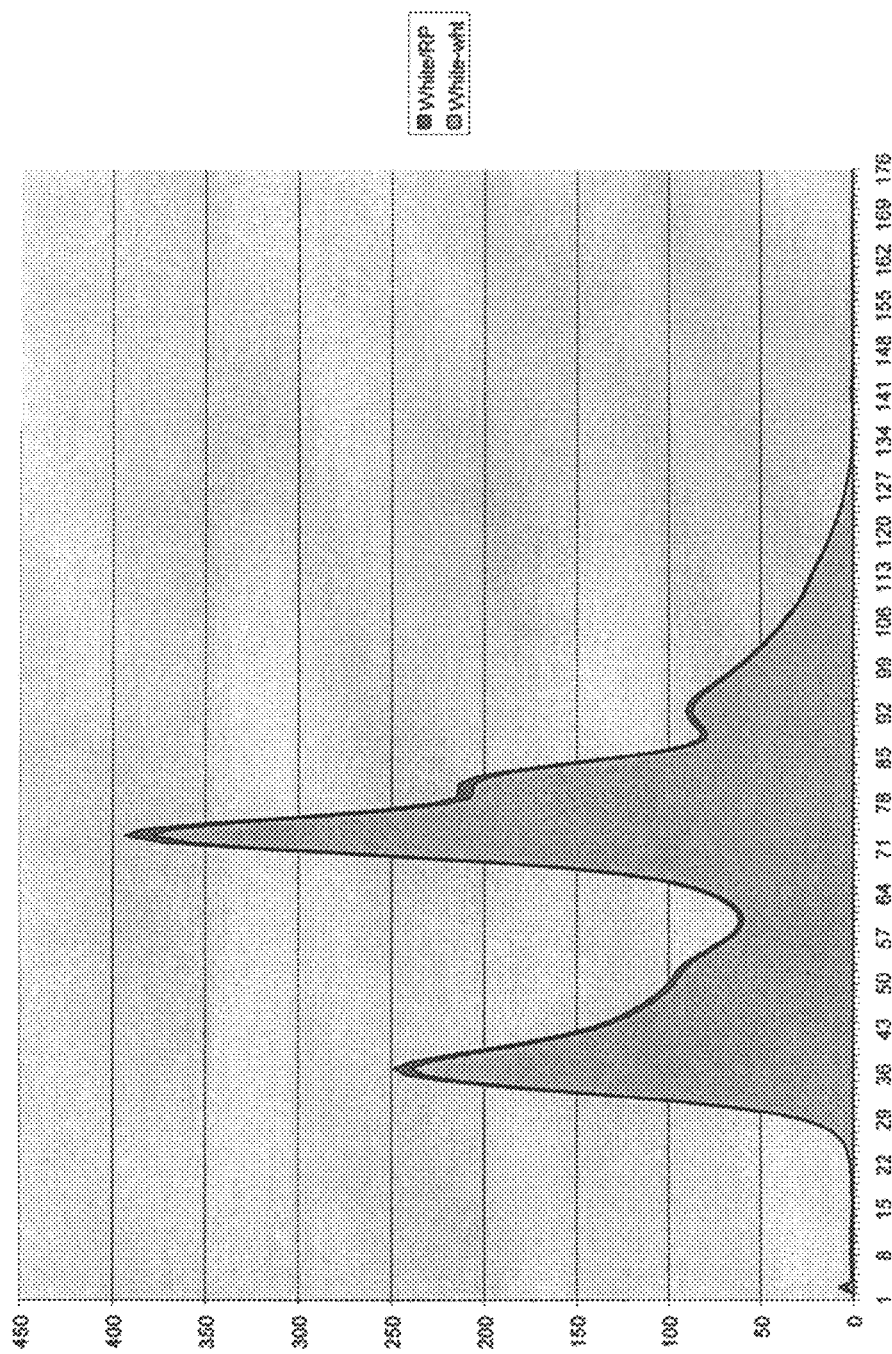
FIG. 23 is a graph comparing the photonic quantity measurement from a photometer for a white Macbeth chart sample measured under white light compared to the photonic quantity measurement for the white Macbeth chart sample measured with an image of the red sample reprojected on the red sample.

FIG. 17 shows how the digital artist might create a separate tree image 94 to represent a lightning sequence. The location of the highlights 96 (bright areas) represents the from-to direction of the virtual lightning. FIG. 18 shows an original projection patterned image on the set of FIG. 5. Stated differently, from the perspective of the projector P8 illuminating the area as shown in FIG. 6H, FIG. 18 shows an image of the illumination area of FIG. 6H projected on the area of FIG. 6H. FIG. 19 shows a soft edge blending mask 98 for the image of FIG. 18. A soft edge blending mask may be used to eliminate the appearance of noticeable lines or regions where projection areas overlap. In such overlapping areas, the patterned image of the object may be reprojected on the object twice resulting in a visual difference between adjacent areas where the patterned image is only projected on the object once. The blending mask may be used to eliminate and soften this effect.

Hence, as illustrated at least with the examples of FIGS. 12-19, besides projection of a matching aligned patterned image, aspects of the present disclosure involve various object appearance enhancement techniques, that may be used alone or in conjunction with the image reprojection techniques discussed herein.

Figure 24:
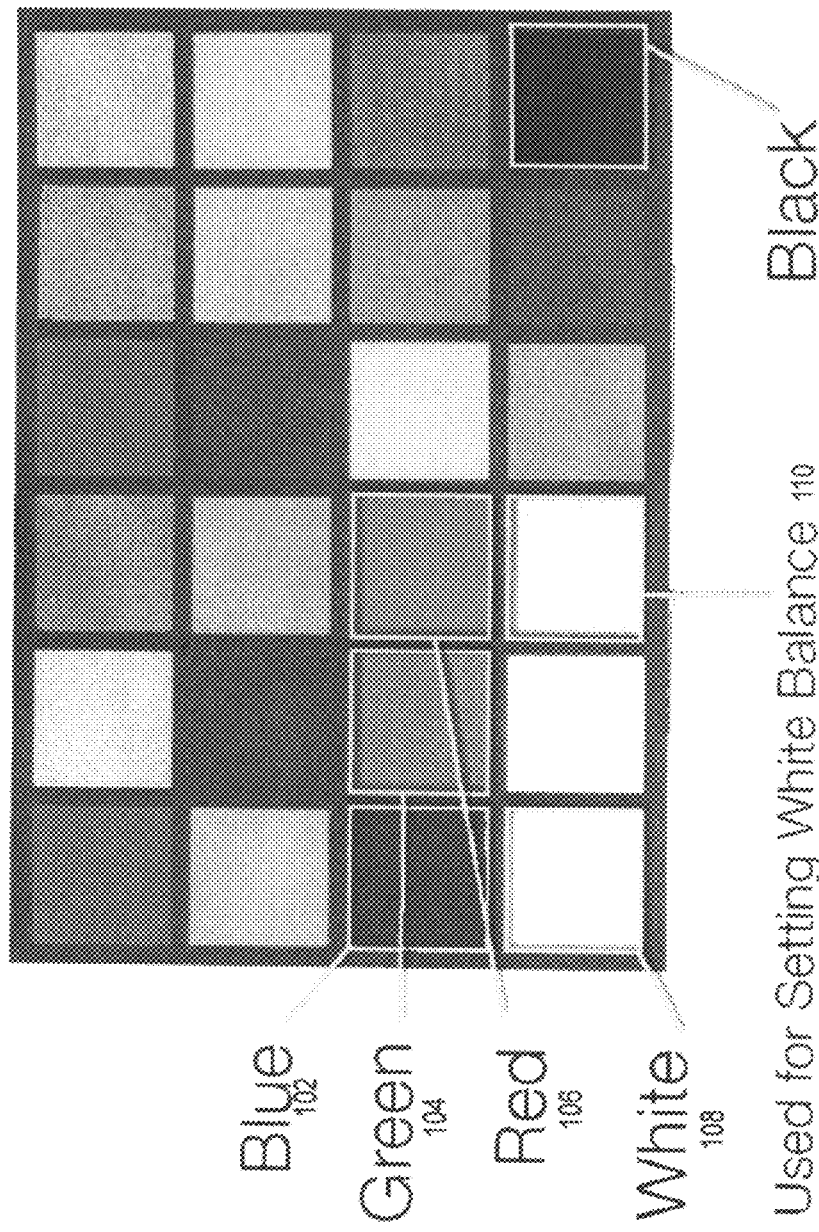
FIG. 24 is a Macbeth color chart used to generate the graphs of FIGS. 20-24.

FIGS. 20-23 are graphs illustrating the photometer values (from Photo Research, Inc. SpectraScan® spectroradiometer PR-705) taken directly from an object surface (blue shaded curves illuminated by white light) compared to photometer values taken from an object surface with an image of the object aligned and reprojected on the surface (red shaded curves). The horizontal axis of each graph is wavelength measured in nanometers, and the vertical axis of each graph is watts per meter square. The data is for a GretagMacbeth Co. "Macbeth" color chart with known color samples as shown in FIG. 24.

Blue 102, green 104, red 106, and white 108 color samples of the chart were sampled. A photometer was used to measure each color square under pure white light from a projector. Individual color square of the color chart were then digitally photographed under the same light, and saved as raw uncompressed files. The resulting image files were color balanced to the lightest grey Macbeth color sample 110. The resulting files were reprojected on the original Macbeth chart color sample and resampled with the photometer. The charts generally show saturation/chromo levels. The scale of each chart is from 350 nM to 1100 nM in even increments over the range.

In the legends, the term "BLUE/RP" indicates that the graph shows the image re-projected on the Macbeth chart color samples of the respective color 102, 104, 106, 108. With blue, the images were shot under blue light from the projector. The term "Blue/w" indicates that the original sample was shot under white light from the projector. For each set of graphs, blue (FIG. 20), green (FIG. 21) red (FIG. 22), and white (FIG. 23) it can be seen that the watts per meter square value is greater for the photometer measurements of the Macbeth color sample where the color is reprojected (red curves) on the sample compared to only the Macbeth color sample (blue curves). The increased watts per meter square value measures photonic quantity at each given wavelength, and is indicative of at least saturation and chroma. Hence, the graphs show greater saturation and chroma for the colors reprojected. By reprojecting the painted color of a typical scenic surface back upon itself, the visual saturation and contrast are enhanced. As the dynamic range of the lighting (projection) increases, the scenery/set may become(s) more vivid and accurate in it's color reproduction. In the case of the described cottage and forest of FIG. 5, etc., the visual representation dramatically reproduces the color depth and vibrancy of an animated feature film, extending well beyond the range and ability of conventional theatrical lighting.

Figure 25:
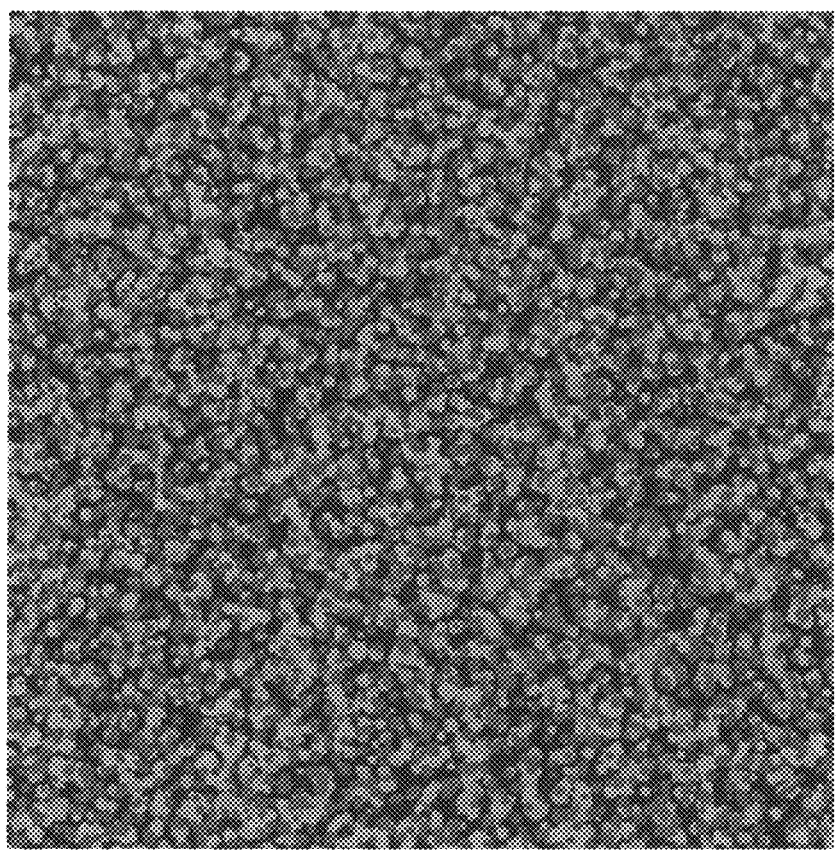
FIG. 25 is an example of a tessellated scrim fabric that may be used with various implementations of the present disclosure.

It is possible to coat an object with a digitally printed, tessellated scrim fabric. For example, the fabric could be glued to the surface of an object, with the undercoating of the object being black. The fabric may be digitally printed with a red-green-blue pattern as shown in FIG. 25, as one possible example.

The color range of each component would be carefully matched to the RGB components of the digital image to be projected on the set. Colors falling between the narrow RGB band passes may be represented in much lower reflectance for those individual colors. The digital image projection may exhibit similar high dynamic range and contrast as examples described above and further allow for sweeping environmental changes, i.e., fire to ice, which may not be as visually impactful when the object surface is painted or grey scale as discussed above. From a distance, objects with such a tessellated RGB scrim appear dark grey or black when not illuminated with complimentary light. This allows for "black out" capabilities during specific moments of a production.

Figure 26:
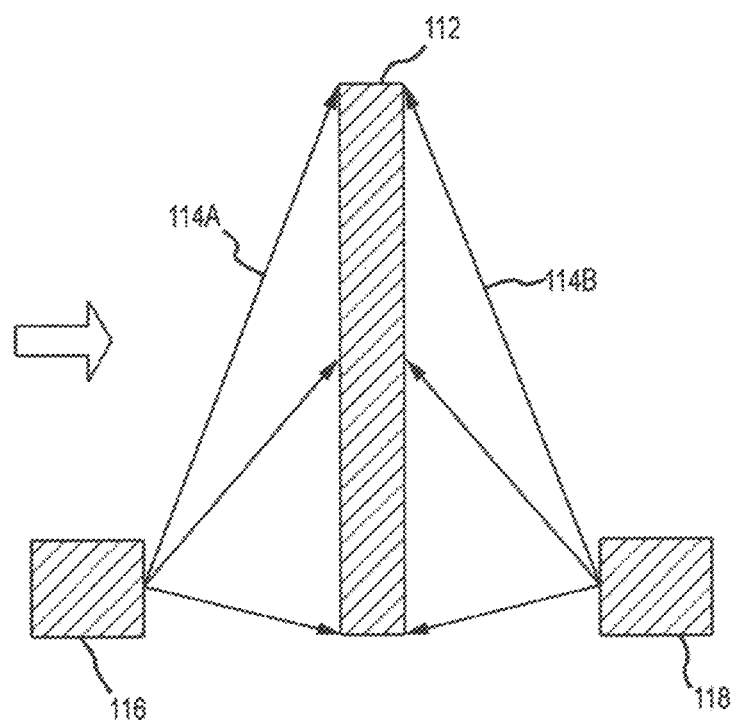
FIG. 26 is a block diagram illustrating a front/rear projection screen configured to simultaneously project an image or video from the front projector and a rear projector.

FIG. 26 illustrates a front projection/rear projection screen 112 configured in accordance with aspects of the present disclosure. Front/rear projection screens are configured such that images or video 114 may be projected onto the screen from either a front projector 116 or a rear projector 118. In FIG. 26, matching images 114A, 114B or video are projected from both the front and rear projectors onto the screen at the same time so that pixels align on the projection screen. If the screen is configured for viewing with respect to the arrow shown in FIG. 26, then the front projector will project the image 114 or video in its intended orientation whereas a mirror image 114B of the image or video is simultaneously projected from the rear projector. In this way, the image from the rear projector will be aligned with the image from the front projector. Hence, for example, the upper left most pixel from the front projector will be the same as the upper right most pixel from the rear projector and so on. In such an arrangement as shown in FIG. 26 it is possible to generate a high dynamic effect for the viewer of the front projection screen or the rear projection screen, depending on the viewer orientation.

Aspects of the disclosure present many possible advantages and improvements, and are applicable in many possible applications. Advantages and improvements include, but are not limited to:

High Dynamic Range color and contrast within the projected environment.
Control of "time of day" while accurately representing shadow and light direction.
The ability to cancel shadows where not wanted.
The ability to add shadow and color where needed.
The ability to overlay video effects to simulate atmospheric effects that conform to the dimensional environment. Shadows, fire, wind, water, lightning, etc
The ability to control color and contrast on isolated set elements, down to a pixel.
Potential applications include, but are not limited to:
Theme Park attractions including dark rides
Theatrical productions at our Theme Parks as well as Broadway and professional productions.
Corporate event production
Concert production Television production
Film production
Window display/Sales-Point of Purchase display
Architectural projection
Pre-visualization of models—this technique is scalable and works equally well on small models.

Although the present invention has been described with respect to particular apparatuses, configurations, components, systems and methods of operation, it will be appreciated by those of ordinary skill in the art upon reading this disclosure that certain changes or modifications to the embodiments and/or their operations, as described herein, may be made without departing from the spirit or scope of the invention. Accordingly, the proper scope of the invention is defined by the appended claims. The various embodiments, operations, components and configurations disclosed herein are generally exemplary rather than limiting in scope.

This non-provisional application is submitted by express mail with color drawings submitted as part of the provisional filing. It is intended that the color drawings and the colored nature of the drawings form a part of this disclosure.

The invention claimed is:

1. A method for projecting comprising:
    capturing an image of an object from a specific vantage point, wherein the image includes:
        one or more alignment marks; and
        an optical pattern corresponding to the object;
    obtaining a projectable image from the optical pattern of the captured image;
    manipulating the projectable image to substantially match a field of view of a projector; and
    from the projector at the specific vantage point, projecting the projectable image onto the object and in alignment with the object.

2. The method of claim 1 wherein the act of capturing an image comprises obtaining a photograph of the image from a camera located at the specific vantage point, the camera positioned in coaxial alignment with the projector.

3. The method of claim 1 wherein the act of capturing an image comprises generating a computer graphic image using a virtual camera located at the specific vantage point.

4. The method of claim 1 further comprising aligning the projectable image with an optical image on the object.

5. The method of claim 4 wherein the act of aligning further comprises:
    identifying the one or more alignment marks in the captured image of the object;
    sizing the projectable image using the alignment marks such that the one or more alignment marks in the projectable image align with corresponding positions of the object.

6. The method of claim 5 further comprising at least one of cropping, rotating, skewing and distorting the projectable image to align with the object.

7. The method of claim 1 further comprising scaling a resolution of the projectable image to match a resolution of the projector.

8. The method of claim 1 wherein the image information comprises at least one of color, saturation, hue, contrast, brightness, luminance, chroma, colorfulness, and shadow information.

9. A system configured to perform the method of claim 1.

10. A method for projecting comprising:
    obtaining a projectable image of an object having a surface with an optical pattern;
    manipulating the projectable image to substantially match a field of view of a projector; and
    projecting by the projector an image towards the surface of the object, wherein the projected image comprises one of:
    the obtained image; or
    a modified version of the obtained image, wherein the modified version comprises modifications to one of color, saturation, hue, contrast, brightness, luminance, chroma, colorfulness, and shadow information.

11. The method of claim 10, wherein the obtained image comprises one or more alignment marks, the method further comprising aligning the projected image using the one or more alignment marks.

12. The method of claim 1, wherein the act of capturing an image comprises obtaining a photograph of the image from a camera located at the specific vantage point, wherein from the specific vantage point the camera has approximately the same field of view as the projector.

13. The method of claim 12, wherein a nodal point of the camera and a nodal point of the projector are co-located.

14. The method of claim 1, wherein the act of manipulating the projectable image to substantially match a field of view of a projector comprises at least one of cropping, rotating, or skewing the image.

15. A method for projecting comprising:
    capturing an image of an object having one or more alignment marks defined within a boundary of the object from a specific vantage point, wherein the image comprises:
        one or more alignment marks; and
        image features corresponding to object features of the object;
    obtaining a projectable image from the image features of the captured image;
    from a projector at the specific vantage point, projecting the projectable image onto the object and in alignment with the object.

16. The method of claim 15, wherein the projector comprises a plurality of projectors.

17. The method of claim 15, wherein the act of capturing an image comprises obtaining a photograph of the image from a camera coaxially aligned with the projector.

18. The method of claim 15, further comprising manipulating the projectable image to substantially match a field of view of the projector.

19. The method of claim 15, further comprising scaling the projectable image to match a resolution of the projector.

* * * * *